United States Patent
Bhullar et al.

(10) Patent No.: US 11,972,138 B2
(45) Date of Patent: Apr. 30, 2024

(54) DATA STORAGE SYSTEM FOR BALANCING THERMAL LOAD OVER STORAGE DEVICES

(71) Applicant: Swiss Vault Systems GmbH, Basel (CH)

(72) Inventors: Bhupinder Singh Bhullar, Basel (CH); John Douglas Fortune, Sidney (CA)

(*) Notice: Subject to any disclaimer, the term of this patent is extended or adjusted under 35 U.S.C. 154(b) by 15 days.

(21) Appl. No.: 17/594,478

(22) PCT Filed: Apr. 17, 2020

(86) PCT No.: PCT/EP2020/025176
§ 371 (c)(1),
(2) Date: Oct. 18, 2021

(87) PCT Pub. No.: WO2020/211985
PCT Pub. Date: Oct. 22, 2020

(65) Prior Publication Data
US 2022/0214829 A1 Jul. 7, 2022

(30) Foreign Application Priority Data
Apr. 18, 2019 (EP) .................................. 19170262

(51) Int. Cl.
G06F 3/06 (2006.01)

(52) U.S. Cl.
CPC .......... G06F 3/0655 (2013.01); G06F 3/0604 (2013.01); G06F 3/067 (2013.01); G06F 3/0676 (2013.01); G06F 3/0679 (2013.01)

(58) Field of Classification Search
CPC ...... G06F 3/0655; G06F 3/0604; G06F 3/067; G06F 3/0679
See application file for complete search history.

(56) References Cited

U.S. PATENT DOCUMENTS 5,423,046 A 6/1995 Nunnelley et al.
6,480,380 B1 11/2002 French et al.
(Continued)

FOREIGN PATENT DOCUMENTS

CA 2089836 C 2/2000
EP 2549847 A1 1/2013
(Continued)

OTHER PUBLICATIONS

International Search Report for PCT/EP2020/025176 dated Sep. 17, 2020.

Primary Examiner — Mark A Giardino, Jr.
(74) Attorney, Agent, or Firm — NORTON ROSE FULBRIGHT US LLP; Aaron Grunberger

(57) ABSTRACT

A data handling device includes a plurality of data storage units that are adapted for long term redundant storage of data, generate heat during operation, and are mounted in a manner allowing cooling, and data accessing circuitry adapted determine information chunks relating to data to be stored such that a subset of the information chunks suffice for reproduction of the data, select several of the plurality of data storage units, write the information chunks onto the selected data storage units, determine from which of the selected data storage units to retrieve information chunks based on temperatures of the data storage units to reproduce the data, where at least some of the subset of data storage units are mounted to be cooled by a common vertical air.

36 Claims, 6 Drawing Sheets

(56) References Cited

U.S. PATENT DOCUMENTS

| | | | |
|---|---|---|---|
| 6,498,723 B1* | 12/2002 | Konshak | G11B 33/08 |
| 6,987,673 B1 | 1/2006 | French et al. | |
| 7,988,063 B1* | 8/2011 | Dufresne, II | G06F 1/20 |
| | | | 361/679.48 |
| 8,095,728 B2* | 1/2012 | Moore | G06F 1/3268 |
| | | | 710/17 |
| 8,806,296 B1 | 8/2014 | Lazier | |
| 9,098,433 B1 | 8/2015 | Lazier et al. | |
| 9,110,797 B1 | 8/2015 | Lazier | |
| 9,232,683 B2 | 1/2016 | Davis et al. | |
| 9,336,102 B2 | 5/2016 | Chen | |
| 10,387,252 B2* | 8/2019 | Gray | H04L 12/4625 |
| 2007/0011288 A1* | 1/2007 | Cases | G06F 9/5027 |
| | | | 709/223 |
| 2013/0021696 A1* | 1/2013 | Davis | H05K 7/20772 |
| | | | 360/97.13 |
| 2014/0137491 A1 | 5/2014 | Somani et al. | |
| 2018/0192549 A1 | 7/2018 | Boegner et al. | |
| 2018/0376623 A1 | 12/2018 | James et al. | |
| 2019/0037729 A1* | 1/2019 | Jochim | H05K 7/20745 |
| 2019/0050302 A1 | 2/2019 | Juniwal et al. | |

FOREIGN PATENT DOCUMENTS

| | | |
|---|---|---|
| GB | 2436209 B | 3/2011 |
| KR | 20080071366 A | 8/2008 |
| WO | 2010/144677 A1 | 12/2010 |
| WO | 2017/160271 A1 | 9/2017 |
| WO | 2018/106355 A1 | 6/2018 |

\* cited by examiner

1

DATA STORAGE SYSTEM FOR BALANCING THERMAL LOAD OVER STORAGE DEVICES

CROSS-REFERENCE TO RELATED APPLICATIONS

The present application is the national stage of International Pat. App. No. PCT/EP2020/025176 filed Apr. 17, 2020, and claims priority under 35 U.S.C. § 119 to EP 19170262.0, filed on Apr. 18, 2019, the content of each of which are incorporated herein by reference in their entireties.

FIELD OF THE INVENTION

The present invention relates to a data handling device and a method of data handling.

BACKGROUND

Handling data is an essential technique in modern society. While in some instances, an immediate response to data acquired is vital, such as in a case where the data stems from sensors controlling a process, there also frequently exists a need to store data for a long time to allow accessing and processing the stored data later on.

However, where the amount of data to be stored is large, a number of problems arise. For example, the devices used for physically storing data need to have a certain physical volume, weight and usually consume a certain amount of energy, even at idle.

While the general progress in the state of the art allows to increase the storage density and thus reduce the volume and, to some degree, energy data storage units need to store a given amount of data, this hardly solves the general problems of storing data. This is due inter alia to the fact that as data processing becomes more effective and faster and new methods of processing data such as those offered by artificial intelligence emerge, more and more data can be evaluated. This, in turn, triggers generation and storage of more and more data.

Furthermore, progress in fields other than pure data processing can also trigger storing of ever larger amounts of data. For example, progress in genomics nowadays allows to determine the entire genome of a person at costs several orders of magnitude lower than a decade ago. At the same time, methods of personalized medicine have been developed that allow to produce personalized vaccines against cancer or determine personal risk factors associated with certain diseases. In view of this, in the health industry, a need nowadays exists to store large amounts of personal genome information for a large number of persons and to process the data. As another example, in large industrial plants more and more data are produced by sensors controlling the machinery. From evaluation of such data, failure of expensive machines can be prevented, although this may require complex data processing techniques.

The large amount of data also gives rise to problems as accessing data generates heat, for example because in a hard disk device one or more disks must physically rotate and read/write heads need to be positioned; similarly, in an solid-state drive (SSD), storage cells need to be charged/recharged. Also, the circuitry controlling the data storage units will consume energy. Where the amount of data is particularly large, the energy consumption will be significant even without data processing. It should be noted that in a data processing center, the overall energy consumption might reach a level where cooling becomes necessary, and which may add further to the overall consumption of energy.

As an example, regarding energy consumption for storing and retrieving data, a conventional hard disc having several terabytes of storage capacity nowadays consumes about 7.5 watts even at idle, with the power consumption increasing for random read access to levels such as 9 watts and requiring currents to start up, that is to spin up the rotating disks of for example 1.8 amp at 12 volt (exemplary data taken for a 8 TB Seagate Enterprise NAS HDD ST8000NE0001) Conventional SSDs may require for example 3 to 4.5 watts per disk unit. While this power consumption is not critical in a standard environment such as a desktop, computer or a laptop having one or two disks, the overall heat generated in a data center where petabyte data capacity is needed and hence a large number of data storage units such as HDDs are needed, is significant. Note that frequently, where cooling is necessary, the exact amount of cooling necessary is hard to determine and hence, the device is cooled to a temperature lower than absolutely necessary. Also, a plurality of techniques have been suggested to improve cooling of data storage devices.

From U.S. Pat. No. 9,232,683 B2, a data storage system is known that comprises an enclosure; plural drawer structures each containing plural storage media such as disk drives, wherein the storage media are arranged such that air can pass vertically within the system through and between at least 2 of the plural drawers thereby to cool the disk drives in the system by a vertical of air within the system; and air flow generating means to generate a vertical flow of air through the drawers. It is suggested that this is advantageous over a horizontal cooling system.

U.S. Pat. No. 9,232,683 B2 also suggests that air flow generation means are arranged at the bottom of the storage system to blow air vertically upwards through the two or more drawers to provide a simple and reliable means by which the required vertical air flow within the storage system can be achieved. This enable to use fewer air flow generation means compared to if horizontal air flow is exclusively used in a rack to cool the disk drives. It is stated that an intermediate structure conventionally provided can be removed to increase the package density. It is stated that typically, rotary fans are used for generating the required airflow. Control of the fans can be achieved either internally by the rack control system all via some external control means.

From U.S. Pat. No. 6,480,380 B1, methods and apparatus for cooling a disk drive is known. It is suggested that a disk drives assembly, comprises: a disk drive that stores and retrieves computerized data; a connector, coupled to the disk drive, that connects the disk drive to a computerized interface; and a support member that supports the disk drive, the support member defining an input louver that redirects air from an air stream towards the disk drive, and a housing member which is configured to couple to the input louver and to the disk drive, wherein the input louver includes a redirection member which is configured to deflect air from the air stream stream through a hole defined by the housing member towards the disk drive.

The document suggests that it is advantageous if a redirected air impinges on a disk drive in a nearly perpendicular direction to more directly break into a boundary layer along areas of the disk drive creating air turbulences that increase the convective heat transfer coefficient of the disk drive arrangement. It is mentioned that a disk spindle of a hard disk is a substantial source of heat and that heat can be removed therefrom by the louvers.

From U.S. Pat. No. 6,987,673 B1, a data storage subsystem is known that is configured to mount within a rack mount cabinet. The data storage subsystem includes a housing configured to mount to a set of vertical rails of the rack mount cabinet, a set of circuit boards configures to install in a vertically aligned manner within the housing to define a set of vertically oriented channels within a central space defined by the set of vertical rails of the rack mount cabinet, and a fan assembly configured to mount to the set of vertical rails in a position above the housing to generate a vertical air stream through the set of vertically oriented channels and to exhaust the vertical air stream to an external location above the rack mount cabinet. The vertical air stream enables robust heat removal from the set of circuit boards even if the rack mount cabinet does not reside in a cold-isle environment.

It is suggested that even though hot air tends to rise vertically, cooling subsystems frequently attempt to direct air laterally in a direction that is substantially perpendicular to the vertical direction. Therefore, U.S. Pat. No. 6,987,673 B1 suggests techniques for mounting a data storage subsystem within a rack mount cabinet where the data storage subsystem has a fan assembly configured to generate a vertical air stream through at least a portion of the rack mount cabinet and to exhaust the vertical air stream to an external location above the rack mount cabinet. To this end, a back plane mounts within a housing and circuit boards individually are inserted into the housing. The circuit boards are to connect in a substantially perpendicular manner to the back plane and the back plane has connectors on both sides. It is suggested that lowering the operating temperature increases reliability.

From US 2018/0192549 A1, a vortex-producing fan controller is known, using a variable-speed vortex-producing fan positioned above a server rack to create a helical airflow within the server rack that couples with cooled air entering a data center through a floor opening situated near a bottom of the server rack. A speed of the variable-speed vortex-producing fan and a flow rate of the cooled air coupled within the helical airflow up through the server rack are adjusted responsive to changes in input air temperature of air entering the variable-speed vortex-producing fan detected using a fan input air temperature sensor positioned above the server rack. Reference is made to data centers where cooled air is provided by blowing cooling air through perforated tiles of a sub-floor in a data center. Forming a vertical vortex of air around the data servers in an individual server rack that stays in laminar contact with servers from its floor entry into the data center until its exhaust through a vortex-producing fan situated above an individual server rack is stated to prevent factors such as temperature gradients between two air masses from causing turbulent airflow in the data center.

A dedicated server temperature control system is suggested that is provisioned with a specified fan input air temperature range to "self tune" heat extraction from a server rack to which it is dedicated.

From US 2018/0376623 A1, a server system is known comprising a frame including a support structure; a server supported by the support structure; and an actuator configured to cause the server to transition from a first position to a second position to increase exposure of the server to airflow to transfer heat away from the server via convection and from the second position to the first position to decrease exposure of the server to the airflow. It is suggested that the server can provide operational characteristics that are indicative if of the heat load, for example power usage, operational speed and/or frequency and/or utilization. Such operational characteristics are suggested to be transferred to a controller that generates an actuator control signal.

From WO2010/144677 A1, a cooling system for a computer server cabinet in a data center is known. The system includes a raised floor defining a pressurized under-floor plenum; a computer room air conditioning unit disposed on the raised floor and having hot air inlet and a cold air outlet, wherein the cold air outlet is in fluid communication with pressurized under-floor plenum; and a server cabinet housing server equipment and including a pressurized vertical plenum in fluid communication with under-floor plenum via an inlet duct. The server cabinet is stated to be configured to receive the cold air stream from the under-floor plenum via the inlet duct into the vertical plenum and draw the cold air across the server equipment to provide cooling without the use of external fans.

In the document it is stated that energy wasted in moving excess air that is air that does not serve to cool equipment, can account for 10% or more of the total energy consumed in a data center. It is also stated that by distributing equipment around a room, the heat load within a data center can be evened out. It is inter alia suggested to form a pressurized vertical plenum between a front door and a front surface of the server equipment in a server cabinet. It is also stated that causing the server equipment to overheat might lead to catastrophic failures and data loss. A maximum power density using standard server cabinets and perforated floor tiles is stated to be limited to approximately 5 kW per cabinet. It is stated that if no local high-speed fans are required, noise is reduced while efficiency and reliability are increased, because fan operation is stated to require a significant amount of energy and to introduce a point of failure within a cooling system.

From US 2019/0037729 A1, a data center cooling system is known that includes circulating with at least one cooling unit to cooling airflow from a human occupiable work space of a data center through an open front side of at least one server rack configured to support a plurality of data center computing devices with at least one server rack being positioned in a bay of a plurality of base of a server rack frame assembly that are defined along lengthwise dimension of a frame assembly.

From US 2014/0137491 A1, a multi-floor data center is known having a plurality of floors with sets of server racks disposed on each floor and a common vertical airflow plenum.

From WO 2018/106355 A1, an arrangement is known wherein an elongated storage module is used that is having a thin and long SSD form factor. A plurality of such elongated SSD memory cards are provided and fans blow air across these elongated memory cards. In WO 2017/160271 A1, data storage system connectors for use with a parallel array of dense memory cards and high airflow are known.

Furthermore, it is noted that data handling devices for storing large amounts of data not only have a rather high volume and generate significant amounts of heat during operation, but that also their weight may be very significant which may need to be taken into account when architecturally designing data processing buildings. For example, it is well known to place data handling devices in racks. These racks can be standard 19-inch wide racks that are typically very deep front to back to accommodate the common long server chassis. To allow for wiring to power, ethernet and other interconnections at the back of the server, this generally 1-meter length is further extended. Frequently, a plurality of racks are placed side by side creating both frontside and rear side corridors in order to access the front and rear of racks and the devices placed therein for maintenance or replacement. This arrangement needs a working corridor both in front, and at the rear for maintenance, usually resulting in 50% or more floorspace overhead, resulting in greater floorspace needed compared to a more space efficient arrangement.

Typical chassis installed in racks are wide and long, but relatively thin vertically. The two thinnest chassis are 1.75 (44.5 mm) and 3.5 inches (89 mm) thick, and since the construction of the chassis disallows vertical air movement for cooling, the diameter of cooling fans is limited. To move the required amount of air, the fans must thereby spin at a very high speed, which not only creates a loud noise, but also causes greater wear on the fan bearings which shorten their life. This noise eliminates any comfort for a user working in the vicinity of the data storage units and necessitates either ear protection, or the separation of the data storage units from the working place, and usually both.

An additional problem that arises when storing data for a long time is that data storage units may fail over time. Such failures occur for a variety of reasons, such as head stiction or failure of integrated circuits, capacitors, motors, bearings, and so forth. The lost capacity must then be restored by replacing the failed unit (disk or SSD) used to build the data storage units. Also, it needs to be taken into account that a data storage unit might be physically destroyed due to events such as fires, earth quakes asf.

Physical failure of more passive, non-plug & socket components can also happen, but due to their passive nature, failure is rare enough to expect they will last the life of the system. Nevertheless, relative ease of replacement is also a consideration in the design.

Lastly, the optimal system should be resilient against gross catastrophes such as electrical surges, sprinkler failures, fires or earthquakes.

Problems associated with potential loss of data storage units and other parts of a data storage server system must be taken into account where access to the data is vital. It has been reasonable to guard against loss of small amounts of data by mere creation of two or more copies of the data on differing physical media. When the data gets sufficiently large the cost escalates and therefore to safely and economically store larger amounts of data, the invention and use of more sophisticated methods achieve data redundancy with less cost than naive duplication of storage.

A desire to improve upon redundant duplicated storage has led to techniques such as RAID (redundant array of independent disks), RAID 1 (mirroring of complete disks), and RAID 5 (block-level striping with distributed parity). However, where a data storage unit that is part of a RAID system fails, the unit in that set of RAID disks needs to be replaced in order to maintain (or re-establish) redundancy. The specific failed drive needs to be physically replaced before this rebuild process can begin. Once a failed storage unit has been physically replaced, it will be necessary to rebuild the RAID redundancy by regenerating the lost data from the remaining disks, a non-trivial computational effort, and then storing the generated data on the replacement disk. This typically takes hours to days in time, and the extra strain of thrashing the remaining drives to provide information for the data regeneration increases the likelihood of their cascading failure. Additionally, the extra contention for disk access may hinder or prevent legitimate external access to that data.

From U.S. Pat. No. 8,806,296 B1 and also from U.S. Pat. No. 9,110,797 B1 and U.S. Pat. No. 9,098,433 B1, it is known that in the course of modern electronic communication, a considerable amount of data are generated and that much of the generated data reside in long-term storage array depositories where stored data may not be accessed frequently. U.S. Pat. No. 8,806,296 suggests a data storage system that is designed to take into account a gradual decay in access frequency. It is observed in U.S. Pat. No. 8,806,296 that entropic effects upon data stored upon storage hardware and anti-entropy correction routines can be taken into account. Entropic effect's mentioned are hardware, for example of magnetic media, data unavailability and/or data loss due to hardware malfunction, environmental factors, physical destruction of hardware, random chance of other causes. It is suggested that such effects be detected and that preemptively and all reactively anti-entropy correction routines and/or policies are instituted. The documents suggest inter alia to use erasure coding to provide for redundancy.

From U.S. Pat. No. 9,336,102 B2, a method is known that includes receiving from a plurality of data nodes of a distributed file system an indication of whether a fault condition exists with respect to a storage resource of the respective data node. The method may also include receiving an input/output request for a storage resource of a particular data node from a host information handling system communicatively coupled to the distributed file system. The method may further include, responsive to the input/output request, directing the input/output request to the particular data node if no fault condition exists with respect to storage resources of the particular data node and directing the input/output request to another data node of the distributed file system if a fault condition exists with respect to one or more storage resources of the particular data node.

In particular, U.S. Pat. No. 9,336,102 B2 states that a distributed storage system may be used as a storage solution and that in a distributed file system, data may be spread across multiple storage nodes which may allow for redundancy and increased performance. It is also noted that when a disk within a storage node of a distributed file system fails, the distributed file system is typically rebuilt to reconstruct or recover the data of the failed disk, such rebuild being enabled by redundant data stored on the distributed file system. It is stated that during such rebuild process, input/output performance of information handling systems attempting to access storage nodes may be degraded.

From US 2019/0050302 A1 methods and systems for identifying a set of disks within a cluster and then storing a plurality of data chunks into the set of disks such that the placement of the plurality of data chunks within the cluster optimizes failure tolerance and storage system performance for the cluster are known. The plurality of data chunks may be generated using replication of data (e.g., using a Reed-Solomon code or a Low-Density Parity-Check code). The topology of the cluster including the physical arrangement of the nodes and disks within the cluster and status information for the nodes and disks within the cluster (e.g., information regarding disk fullness, disk performance and disk age) may be used to identify the set of disks in which to store the plurality of data chunks.

In more detail, it is suggested that each file stored in a distributed file system may be partitioned into one or more chunks and that each of the one or more chunks may be stored within the distributed file system as a separate file. The files stored are suggested to be replicated or mirrored over a plurality of physical machines creating a load-balanced and fault-tolerant distributed file system. The data chunks associated with the file stored in the distributed file system may include parity data for example due to erasure coding. It is stated that storage appliances may include temperature sensors for sensing a temperature of the storage appliance or components therein and that the data center or components within the data center may include temperature monitoring circuitry for monitoring temperatures associated with the room, a rack, a server box housing a server or components of the server for example a semi-conductor chip or a processing core used by the server and detecting when a monitored temperature is above or below a particular threshold (for example the temperatures associated with the server box is above 85° C.). It is suggested that the topology of the cluster and status information is used to determine the subset of disks within the cluster in which to store the plurality of data chunks. Component status information such as a disk performance, disk age and disk failure history are suggested to be updated whenever a significant cluster event occurs such as a node or disk failure or addition or deletion of a node or disk from a cluster.

From GB 2 436 209 B, methods and systems for hierarchical management of distributed data are known. The documents states that in a distributed system, problems associated with sharing data and maintaining shared data in consistent and robust states must be addressed. It is stated that in a data storage system, memories serving as cache for data as well as the storage location for various entities can be provided. It is noted that an m+n erasure coding redundancy scheme is described in some detail.

From CA 2,089,836 C, high availability disk arrays are known and a method for handling data in a plurality of data storage disks is suggested for being used when the disks are being operated in a non-degraded or a degraded mode. It is stated that re-constructing the system having a failed disk requires extra time to reconstruct the data and that in addition, a situation can occur in which there is a power failure wherein power failures can have adverse effects on the entire system.

SUMMARY OF THE INVENTION

As can be seen in the art, it is not expected that failure of a single data storage unit could be prevented completely. However, what should be avoided is that hardware failure is fatal.

The replacement of a disk can easily restore the lost capacity, but then the issue arises how to restore the lost data content. It has been reasonable to guard against loss of small amounts of data by mere creation of two or more copies of the data on differing physical media. When the data gets sufficiently large the cost escalates and therefore to safely and economically store larger amounts of data, the invention and use of more sophisticated methods achieve data redundancy with less cost than naive duplication of storage.

The entire data set could be mirrored and stored at physically separate locations remote from each other. While this increases safety against data loss, replication of data on a grand scale reintroduces the problem of poor economics. Further, this does not solve the problems relating to storage size and overall energy consumption at any given site.

Another problem that needs to be addressed when storing data is safety against theft of data. In a large number of applications, the system used for generating data, for storing data and for evaluating and processing the data and outputting results will be connected to some wide area network such as the Internet. Accordingly, a danger exists that third parties access the data stored to obtain information there from, that they manipulate data and so forth. This is obviously completely unacceptable where handling sensitive patient health care data, confidential business data and so forth. Even where no connection to the Internet or other wide area network is given, a danger exists that the data storage units or at least parts thereof are physically removed.

This could of course be prevented by standard security measures such as installation of surveillance cameras, human surveillance, etc., but this significantly adds to the complexity and cost of storing data. Also, data can be encrypted and decrypted, but encrypting data consumes significant amounts of energy and, where the data stored are particularly valuable, serious efforts to decrypt data can be expected. Hence, particularly powerful encryptions should be used where data is particularly valuable.

While it might not be necessary to simultaneously and completely solve all of the above-mentioned problems, such as protection against theft, protection against third party access via the Internet, protection against failure, or reduction of energy consumption, for all applications, it is desirable to improve the data handling with respect to at least some of the problems outlined above to at least some degree.

According to a first aspect of the invention, what is suggested is a data handling device comprising a plurality of data storage units adapted for long term redundant storage of data, generating heat during operation, and mounted in a manner allowing cooling, and data accessing circuitry adapted to receive data to be stored, to determine a number of information chunks relating to data to be stored such that a subset of the information chunks having less elements than the overall number of information chunks suffice for reproduction of the data, to select several of the plurality of data storage units for storing the information chunks, to write the information chunks onto the selected data storage units and to retrieve information chunks from a subset of the selected data storage units to reproduce data, wherein at least some of the plurality subset of data storage units is mounted to be cooled by a vertical air flow common to at least some of the subset of the selected data storage units and the data accessing circuitry is adapted to determine the subset of the selected data storage units from which information chunks are to be retrieved in response to temperatures of the data storage units. Note that the adaption of the data accessing circuitry can be effected by dedicated electronic hardwired circuits and/or by way of stored executable information that when executed implements a corresponding selection.

Thus, a specific arrangement is provided that not only allows to mechanically increase the density of components compared to conventional systems, e.g., by mounting the data storage units of the data handling device directly to a printed circuit board, but also allows to take advantage of this by significantly reducing energy consumption. Without reduction of energy consumption, the storage density is hard to increase as overheating is to be expected even though a vertical air flow path between the data storing units is provided. Accordingly, the invention not only suggests to provide for a specific way of cooling as was done in the art before, but then ensures that the system is operated in a manner taking maximum advantage of the vertical air flow. Note that in a preferred embodiment, the spatial distribution and/or spatial location of data storage units can be taken into account as well, e.g., because a data center operator wants to use to disks at the top of a rack, in order not to heat up a large number of disks above a disk accessed, such as would be the case if the disks at the bottom of the rack would be preferred.

However, in particular to even out the temperatures, disk placed low in a rack or in a lower row can be operated as well.

In more detail, by selecting the proper data storage units from which to retrieve information chunks, namely in view of data storage unit temperatures, a number of advantages may be obtained. It will be understood that other characteristics can be taken into account when selecting the proper data storage units from which to retrieve information chunks. For example, if a large number of those data storage units that might be accessed for retrieving the information all have the same temperature or have a temperature in the same temperature range or have a temperature which is sufficiently low, a selection can be based additionally on parameters such as instantaneous data bandwidth available to a node a data storage unit is assigned to and/or the bandwidth available for accessing a given data storage unit and/or a current usage of the disk by other retrieval requests. It is to be noted that where several parameters are taken into account to select from which data storage units data is to be retrieved, such selection can be made in a weighted manner.

Note that where a data processing center is to be operated in a manner emphasizing performance over energy consumption, it would even be possible to merely or primarily consider bandwidths rather than temperatures, thus assigning a higher weight to such factors as the number of parallel accesses to a given disks or data storage unit, whether or not other disks are actively sharing the same channel to the cpu (by taking this factor into account, contention can be avoided or reduced). This is considered inventive per se, claimable independently and/or in combination with other parts of the disclosure. Furthermore, where a plurality of CPUs or other data processing units are provided, a factor considered can be whether or not a given CPU that is used for access of data to a data storage unit is busy so as to avoid going through a busy CPU so as not to bog down other active processes. Note that it should not be assumed each disk of a plurality of disks has maximum bandwidth to the CPU but that in some cases, the channel needs to be shared between several disks. Also, in certain cases, the cpu might be saturated with work and cannot read/write to yet another disk at maximum speed.

Furthermore, the available bandwidth of a connection to a given node to which a data storage unit is connected, could be taken into account so as to use data storage units to which a communication path can be established that is contention free or effected by contention only to a small degree. Furthermore, the entire ethernet bandwidth through all the switches could be considered so as to ensure a contention free communication.

To understand this, first of all, it should be noted that in a modern data storage (and hence a modern data processing center), the data to be stored are distributed to a large number of data storage units due to the technical limitations of data storage units. In contrast to a small scale laptop or computer where a single data storage unit is provided and needs to be accessible most of the time e.g., by spinning the disks, not all data needs to be accessible all of the time in a large data storage center.

Also, in previous times, the periods required to provide a result to a user was determined to a large extent by the time needed for the actual data processing and hence faster and faster processor where needed. Nowadays, more and more data need to be analyzed to obtain results, but as processing can be effected in a largely parallel manner, the speed of the processor becomes less important than the time of accessing the data.

In view of this, the invention considers a change in paradigm. It is considered more important to provide better access to data, and to consider energy of data access rather than the mere energy of actual processing, as once access is obtained, data can now be processed more easily than in previous times.

As both accessing data in a speed efficient manner and processing data with a high processing frequency requires ever larger amount of energy, so energy constraints need to be met, proper use can now be made of the overall energy budget available for data processing. In this context, it has been found that by improved retrieval of data, it is possible to not only make optimum use of an energy budget, but to also at the same time decrease wear, actually improve access and reduce the danger of data theft where necessary.

Improved retrieval of data has been found to be particularly energy efficient as by taking into account the temperatures of data storage units in a vertical air flow, it is possible to not only avoid overheating of certain devices, but to also use the heat capacity of data storage units in the vertical air flow to even out variations in the flow of air leaving the data storage device: where a data storage unit has been used for an extended period and has reached a higher temperature, it can be allowed to slowly cool in an air stream passing the data storage unit, decreasing mechanical stress due to different thermal expansion coefficients of materials used rather than creating extra wear due to overheating. So, rather than using increased cooling to allow operation of a unit close to its maximum safe operating temperature, cooling is kept to a minimum and thermal load is evened out. This reduces overall energy consumption of a data center as excess cooling is avoided.

At the same time, despite a reduction of excess cooling commonly necessary as an incoming air stream needs to have a temperature determined in view of a situation where all data storage units would be operating with maximum energy consumption, the temperature variations of data storage units can still be kept low.

Then, distributing a large number of information chunks to a large number of disks so that later on a selection becomes possible makes it more difficult for a third party to gain unauthorized access to data and from a mere observation of the access pattern without additional knowledge of the temperatures that have an influence on the access pattern, determining the correct data storage units to which certain data has been stored is next to impossible. Accordingly, safety is increased.

In contrast, within the data storage device itself, access is improved, as a large number of data storage units are provided from which a selection is made, so that access to multiple data storage units can be made in parallel, hence speeding up data access—despite the reduction of energy consumed due to the attention to an overall thermal budget. Note that it is next to impossible to exactly predict a future access pattern to a large number of data files; therefore, data cannot easily be stored in a manner certainly improving future access speed. However, providing parallel access allows to speed up access regardless of an initial distribution scheme, in particular as limitations by overheating are avoided.

It should be noted that providing air flow paths requires leaving some space between the data storage units, for example between hard disks used as data storage units. This may seem to decrease the overall density of data storage units achievable; however, as an air flow path is formed there between, additional individual forced air cooling is reduced or rendered not necessary; even where common forced air cooling is provided for, space otherwise needed is significantly reduced.

In a typical embodiment, a housing is provided that is adapted to allow passive flow of air through these flow paths. Such a housing can comprise a plurality of data storage units and can allow to change those "en bloc" if preferred.

Where only passive flow of air is needed, the walls of the housing can have any distance from the components housed, although for data handling devices having a plurality of rows stacked such that the air flow paths between data storage units in one row conform to the air flow paths between data storage units in an adjacent row above or below, and are limited on at least one side by a wall of the housing, a chimney-like effect is more likely to develop, assisting and increasing air flow and helping to even out temperature gradients and variations.

Where additional forced air cooling is provided, this is generally and preferably achieved by providing a common additional forced air stream for a plurality of data storage units. To this end, air must be forced along the air flow paths provided between the data storage units; in order to improve efficiency, a situation should be avoided where forced flow of air bypasses the data storage units close. Accordingly, attention should be paid that the walls of the housing (or at least some internal walls) are close to the data storage units. The walls can be considered close to the data storage units if the distance is such that the overall cross section of bypass air paths formed between the data storage units and the walls is not more than 3 times the overall cross section of air paths between the data storage units. Note that it is preferred if this number is significantly smaller; in particular, it would be preferred if it is not more than 2 times and in a particularly preferred embodiment should be not more than the overall cross section of air paths between the data storage units. Note that this basically relates to the distance between a front cover and the front face of the data storage units, as some space between the side walls of the housing and the outer data storage units in a row of data storage units should be maintained to allow for some air flow—otherwise the heat dissipation of the outer data storage units in a row might be impaired. It is noted that some distance between a front cover and the front face of the data storage units can be left as well, reducing the overall precision needed for building the housing; however, while sensing temperatures might alleviate this, wear would still be uneven if forced air flow paths thru the device are too different.

It is possible to provide a housing with upper and lower entrance openings for each air flow path rather than providing a blank metal sheet as upper and lower cover respectively, as common in racked units. It should be noted that filters can be placed across such openings for preventing dust and other contaminants from entering into the housing without adversely affecting air flow along the air flow paths.

It will also be noted that in operation, heat generated by the data storage units or other parts of the data handling device will lead to warm air rising through the flow paths so that often, no additional cooling is necessary.

The spacing of the data storage units can be such that a laminar flow is obtained even at full load of the data handling device. In other words, a rather slow motion of air very often is sufficient, reducing noise. This is due to the fact that by distributing the read accesses, overheating is less likely to occur and overall ventilation can be reduced.

It should be noted that a typical storage unit such as a hard disk drive (HDD) or an SSD will have some controlling circuitry generating a certain amount of heat and that such circuitry will typically be mounted to the SSD or HDD by mounting a printed circuit board (PCB) to the SSD or HDD housing that, in turn, constitutes a part of the air flow path walls. This is helpful as this circuitry is expected to generate heat and thus be subjected to a higher thermal load and hence the coupling to the heat cooling thereof is improved without active cooling of each single data storage unit.

Furthermore, on the PCB to which the storage units are mounted, at least one integrated data accessing circuit will usually be provided, typically soldered to the PCB.

In this manner, the integrated data accessing circuit or circuitry will also be cooled by air passing through the air flow paths. It should be noted that, while an integrated circuit can be used for accessing the data, for example a microprocessor, such as a CPU, GPU, FPGA, or so forth, additional components may be necessary such as capacitors, drivers, buffers and so forth, which typically also generate heat and/or are sensitive to heat. Such components and/or the integrated circuit can be placed on the PCB between the data storage units, together with suitable circuitry, to switch between different integrated circuits if redundancy for these is considered vital as well. It should be noted that even though such integrated data accessing circuits and/or circuitry could fail, and hence could be redundantly provided on a board, in a majority of cases what is failing is the data storage units. Therefore, even where only a single PCB mount is used, a higher than average security of data is achieved.

Note that it is possible and preferred to use a double-sided PCB having at least one of an integrated data accessing circuitry and a part of the data storage units attached on a back side, with at least some of the remaining data storage units being connected to the other side of board. In this manner, it is possible to dissipate heat more efficiently. Directly vis-à-vis the integrated circuitry on the other side of the PCB, a data storage unit can be provided; in this case, such data storage unit can serve as a thermal sink for the integrated circuitry. In other words, some of the heat generated by the integrated circuitry on one side of the PCB can warm one or more data storage units. As the data storage units will be cooled in the air flow, this reduces the size necessary for a heat sink directly attached to the integrated circuitry. In other cases, an air flow path can be provided directly vis-à-vis the integrated circuitry on the other side of the PCB and thus heat also is efficiently dissipated.

Furthermore, it is suggested that in a preferred embodiment, an integrated data accessing circuit, adapted for accessing data distributed across the plurality of data storage units in a redundant manner, is provided.

Note that the integrated circuit for accessing data can be a dedicated component or can be part of a data processing circuit such as a GPU, CPU and so forth.

In an embodiment of the invention, it is also suggested that at least one data processor for processing data to be stored on the data storage units and/or to be retrieved therefrom is provided, the data processor being preferably selected from the group of CPUs, DSPs, GPUs, and/or FPGAs and combinations thereof, in particular integrated combinations thereof, and the data processor preferably comprising the integrated data accessing circuitry. Note that some of these data processors are capable of directly accessing and addressing data storage devices themselves. This may be sufficient for a large number of cases. In other cases, additional circuits may be useful to allow use of a number of data storage devices larger than initially intended by the manufacturer of the data processor that preferably comprises the integrated data accessing circuit. In such a case, additional circuitry can be provided to multiply or increase the number of data storage units addressable. Note that the additional feature suggested in such an embodiment can be advantageously implemented also in any data handling device wherein no air flow paths are provided, in particular where only security of data stored rather than weight or energy consumption is considered a major concern.

It should be noted that by using a sufficiently large number of data storage units, even where data is split up into several parts, each part being stored in a different data storage unit, a situation can be avoided where reconstructing redundancy of data after more than one data storage unit failed would necessitate to store data on one (or more) data storage unit that already has some of the respective information relating to data stored. Note that this can be advantageous also in any data handling device wherein no air flow paths are provided, in particular where only security of data stored rather than weight or energy consumption is considered a major concern.

Note that generally, the number of data storage units will be rather high, so that typically not only distribution of a given data file to the intended number of disks in a redundant manner can be guaranteed even under adverse conditions such as failure of a number of disks, but also upon detection immediate rebuilding of one or more failed disks and/or reestablishment of redundancy can be started "on the fly" on available local or remote disks, even before physical replacement of one or more of the failed data storage units. For example, where information related to any one given data block or data file is distributed to X+Y different data storage units and failure of up to Y data storage units is tolerated, the overall number of data storage units should be larger than X+Y if on the fly reconstruction is aimed for. This also helps in distributing the thermal load according to the invention. In a particularly preferred embodiment, one or more additional disks can also be provided that can be used e.g., as cache when locally processing data. However, where theft of such a cache shall not result in obtaining undecoded, complete data files, it might be more advantageous to use a volatile memory rather than an additional disk as local processing cache, where data might be stored e.g., in a manner suitable for pending processing request and hence e.g unencrypted. Note that providing additional disks and/or caches implemented as volatile memory can be advantageous also in any data handling device wherein no air flow paths are provided, in particular where only security of data stored rather than weight or energy consumption is considered a major concern.

Note that it is not necessary that all data storage units, e.g., hard disks, have the same data storage capacity. Rather, it is possible to intermix hard disks and SSDs of differing sizes, specifications and manufacture. Note that aside from storage space for storing information related to the actual data, some additional data storage capacity is also needed for storing META data, in particular the locations to which data is written.

It may be useful and preferred to have a number of data storage units in addition to those needed to provide redundancy, so as to have the capability to re-establish full redundancy immediately after the allowed number of failures. Note that this can be advantageous also in any data handling device wherein no air flow paths are provided, in particular where only security of data stored rather than weight or energy consumption is considered a major concern.

Note that it is possible to significantly reduce the thermal strain on any given data storage unit and/or reduce the energy consumption of the arrangement by appropriate selection of the particular redundant data storage units for reading as only any X of the X+Y disks are needed for data reconstruction.

It will be noted that where read and write operations are executed simultaneously or in close temporal relation to each other, for writing it may be necessary to activate some disks currently not spinning, as new information must be written to all disks in a set. In such a case, it is possible to select a number of disks to which data is to be written according to criteria such as overall data storage capacity remaining free on a given data storage unit, frequency of access to a given data storage unit according to a statistical evaluation, number of previous accesses to the data storage unit and/or information relating to errors of the data storage unit. Further, the disks that additionally are to be spun up can be selected such that disks that have not been accessed for a long time are selected to avoid stiction failure; if access to a plurality of disks is necessary in view of a large number of queued requests, it is possible to select disks from which information for a plurality of requests can be retrieved. Note that this can be advantageous also in any data handling device wherein no air flow paths are provided, in particular where only security of data stored rather than weight or energy consumption is considered a major concern, although reducing thermal load on a single device decreases the need for forced air cooling.

It is noted that in a preferred embodiment, only a fraction of the capacity of any given data storage unit is initially used for storing information chunks, so as to tolerate a simultaneous failure of multiple independent units. In the case of a data storage unit of the data handling device having failed, it is possible to immediately start regenerating the data originally stored on the failed disk from the other disks in the set, even before the failed disk is replaced. This holds as long as there is sufficient spare storage space. Again, this is advantageous even without of the provision of air flow paths between data storage units.

To obtain redundancy, a given data packet will not simply be written to a plurality of disks in a mirrored manner, but will rather be mathematically hashed and distributed such that information is written to T (total) data storage units so that it needs to be retrieved only from any D (data) storage units with T>D, and the remainder being P (parity) disks. Thus T=D+P. The quantity P gives the quantity of disk failure tolerance and can be any integer greater than zero. Any combination of reading from integer quantity D storage units among D and P disks will suffice, but the particular data storage units from which data is a read can be optimized in a manner to maximize bandwidth and system throughput and minimize energy usage and disk wear.

It is possible to use an algorithm where redundancy is obtained by writing a certain amount of information as "plain text" original data and writing the remainder disks with encoded parity information. However, this might lead to a case where theft of the single data storage unit to which the original data was written (although not in its entirety) might give a third party access to a complete set of data.

Therefore, in a particularly preferred embodiment, if enough P are created such that P=T such that no "plain text" original data exists on the system, and all original data D must be synthesized from a subset quantity D disks selected from among the P disks. Further, the thief must read or remove at least a quantity of D disks from the selected P disks in order to regenerate the original data, and this becomes a problem for the thief if there are many tens, hundreds, or thousands of disks, since he does not know which particular disks to access or remove.

Further, if he successfully overcame these obstacles, he would only retrieve one file, as a related file will be spread over completely different disks. This is done not only for security, but to increase parallel throughput of storing and retrieving related data across the system.

Again, this is advantageous independent of the provision of air flow paths between units. However, as will be generally understood, combining some of the features which can be implemented in a data handling device not having specifically arranged air flow paths might be advantageously used combined with air flow paths.

Note that additional parameters other than currently executing or pending requests and temperature could be taken into account when selecting from which of the data storage units the data reconstruction information is to be retrieved. For example, should a large number of accesses to a given hard disk have taken place recently, leading to an increased local temperature, it might be advisable to access other units so as to allow the currently heated unit(s) to cool down. This can be implemented by an access algorithm taking into account the current temperatures of a group of the data storage units and a spatial distance from that group.

It is possible that due to a pending access to a given disk or other data storage unit, the disk unit is occupied, or the network bandwidth to that node is saturated, and a pending request has to be queued. While generally, this may not be time critical where the length of time processing data is rather long compared to the time of retrieval of the operands to be processed and/or the time of storing or transmitting the results obtained, such an access contention situation can be avoided by a suitable algorithm. Hence, an access algorithm also taking into account a current access pattern and pending access requests can be implemented. Again, this is advantageous even without of the provision of air flow paths between data storage units.

Also, it may be preferable to take into account when storing or retrieving data that some of the storage units have already spinning disks while other data storage units currently are in an idle state without any disk spinning. In this context, it should be emphasized that the invention can use a de-spinning process where spinning of a large disk constituting a data storage unit or part thereof is stopped if the disk has not been used for a certain time such as 1 sec, 5 sec., 10 seconds, 30 seconds, or 1-5 minutes. Such de-spinning, that is stopping of rotation of a large number of disks in a data storage center helps significantly to reduce energy consumption and becomes possible by using distributed information chunks on data storage units operated in parallel. Note that this is particularly helpful for large data centers where a fraction of data need not be accessed and a sufficiently large number of data storage units are to consume energy without measures to reduce energy-consumption. Note that when de-spinning a disk, procedures such as "parking" a read/write head in a landing zone might be effected in a preferred embodiment. Where a de-spinning is used, it will typically be taken into account whether or not a disk is spinning and/or is both spinning and currently writing/reading. It can also be taken into account whether a de-spinning timer for a given data storage unit is approaching a limit where a de-spinning process can be initiated. In such a case, a selection can be made so that a larger number of disks are de-spinned.

As starting rotation of a disk both causes undue disk wear and consumes a surge of energy, it might be reasonable to preferentially reduce or avoid the use of currently non-spinning disks. The data handling device typically will have more disks than necessary to redundantly store the data according to the algorithm distributing data across the data handling devices. It should be noted that a vast number of possibilities exists to implement a suitable access pattern both for reading and writing, and of such complexity that it may be difficult or impossible to code an algorithm to give an optimal access strategy. Therefore, it may be presumed that a dynamic algorithm using artificial intelligence could be employed to help optimize the disk access and modify its behavior over time to accommodate unanticipated situations. However, in a more simple implementation, an algorithm can also be a fixed algorithm. It will be understood by now that this as well is advantageous even without of the provision of air flow paths between data storage units. Accordingly, this will not be emphasized for other features even though an advantage may be given.

It is also possible not to store the maximum amount of data that can be stored on each of the data storage units while filling the system, but only to partially fill all the disks, rather than fully loading each disk and leaving some empty disks as a remainder. In this manner, when a data storage unit fails, the data that previously was stored on the failed data storage unit can be reconstructed and stored on the reserve storage space previously left unused on the data storage units that are still operable. Even wear and even heating of disks across the system is a further advantage of this access strategy.

Thus, as can be seen from the above, in an embodiment of the invention it is suggested that the implementation is adapted to access data distributed across the plurality of data storage units in a redundant manner, taking (also) into account a current state of operation of several or all data storage units in accessing the data storage units, in particular discriminating the current spinning state of a hard disk (and its close neighbors) and its current and/or anticipated thermal and/or electrical load (and those of its close neighbors). Note that the heat load that will be induced by queued writing and/or by scheduled retrieval can be taken into account to prevent upcoming overheating. Note that local overheating can be avoided by taking into account not just the temperature of a disk when selecting a disk to be accessed but also by taking into account the temperature of one or more neighboring or adjacent disks. Also note that as a further or alternative additional characteristic, the history and/or general usage of the disk could be taken into account.

In a preferred embodiment of the invention, it is suggested that the mount comprises a PCB, on which connectors for a plurality or all of the data storage units are attached, the data storage units in a particular embodiment being directly plugged into the connectors, in particular in a hot-pluggable manner.

Providing connectors for the data storage units directly on the PCB allows to dispense with cable connectors and the like, reducing cost, weight, size and complexity and improving air circulation.

It is noted that plugging a data storage unit directly into a PCB, that is, without using additional cables, connector cable extensions, trays, carrier brackets and so forth, might help to reduce the overall number of components and the overall weight. Therefore, a direct connection to PCB mounted connectors, in particular without using disk trays or carrier brackets is preferred.

As a sufficient amount of cooling is by air passing through the air flow paths, replacing a data storage unit during system operation will not cause a significant interruption of heat transfer given the typical duration for replacing a data storage unit in a hot-plugged manner.

The data stored in a distributed manner can be encrypted. First of all, it is to be noted that distributing any data to be stored on the data storage units in a redundant manner can constitute a sort of encryption in that information on any disk typically cannot be understood (or "decrypted") without access to a particular set of other data storage units. Further, any information stored on each data storage unit (or "disk") can additionally be encrypted locally on the fly. Such encoding and corresponding decoding can also be effected locally.

In an embodiment of the invention, it is also desired that both sides of the PCB are utilized for carrying fixed components and removable elements. These removable elements for the most part are data storage units, but are accompanied by various CPU, GPU, FPGA, ethernet, cache, memory or otherwise pluggably connected components.

In an embodiment of the invention, it is also suggested that the data handling device is adapted for storing information in an encrypted manner, preferably encrypting at least one of data written to the data storage units in a distributed manner and/or information relating to the distribution of data across the plurality of data storage units. It will be understood that the "information" generally refers to data information stored, derived from data to be stored and perhaps other information (such as device location or date, or other factor) and that such information stored allows the system to reconstruct the data it was derived from, and prevents the reconstruction of the data when removed from its environment.

In a preferred embodiment, the data stored is derived from the data to be stored (e.g., the data files or data streams transmitted to the data handling device for storing) by techniques such as erasure coding rather than storing an entire data set or large blocks of data on any one data storage unit merely mirrored and/or in an unencrypted manner. Such erasure coding can be improved by having energy efficiency as a goal in its implementation. Also, it is preferred to store information obtained from any one data file by erasure coding or the like not in a manner where all erasure coded information parts are always stored on the same data storage units in the same sequence, but where the sequence of data storage units and/or the data storage units themselves are changed after some length of time. This leads to a plurality of advantages.

It should be noted that meta information relating to the storing the distribution of data onto the different data storage units can be provided, preferably provided redundantly, on different data storing units, and such meta information can be compressed and/or encrypted. Both measures will create additional difficulties even where a third party has gained access to all data storage units. Note that it is possible to "fill" disks prior to their use with random patterns to complicate decryption of stolen information.

Then, it is possible to encrypt the data representing the distribution differently for each data storage unit, preventing use of a simple pattern-matching algorithm for identifying the distribution information, which should be similar or identical on each disk. For example, such encryption could rely on an individual electronic serial number of a given data storage unit, a number of the connector the storage unit is plugged in or the like. It should be noted that a corresponding encryption can also be used for storing the actual data. Any such encryption need not consume large amounts of energy. For example, it would be possible to use cyclic bit shift operations or simple bit permutations, which both might be determined individually for each data storage unit. As stated above, encryption presents an energy problem for standard systems.

The data storage units will typically be HDD or SSD. Such data storage disks are commodity units readily available at competitive prices which is a particular advantage given that redundancy for a large storage capacity is needed. Conventional HDDs or SSDs have a 2.5 inch or 3.5 inch form factor.

In an embodiment of the invention, it is also suggested that at least some of the plurality of data storage units are HDDs and/or SSDs, in particular having a 2.5" or 3.5" form factor.

While obviously both form factors could be used as well as any other current or upcoming but not mentioned form factor, it is noted that in a practical embodiment, 2.5 in form factors have been found to be perfectly suitable. Air flow paths formed between such units will preferably have a minimum spacing, which both allows air flow, but yet allows dense packing. The desirable spacing between units is in the 1 mm to 10 mm range, depending on the quantity and strength of fan forced air provided. In a particular preferred embodiment between 2 and 4 mm are suitable for sufficient air cooling through the air flow paths, depending inter alia on the number of rows stacked one upon the other (and hence the length of conduits or chimneys built by the air flow paths), the circuitry design used and so forth. It should be noted that selecting a suitable spacing might depend on the circumstance and use case. Reducing the spacing will lead to a largely non-laminar flow requiring greater fan force whereas selecting a large spacing reduces the overall storage density but opens the opportunity for reduced fan speeds and perhaps completely passive cooling operation. Another consideration is to allow sufficient spacing to enable easy extraction and replacement of individual disks.

Note that in a preferred embodiment, the current status of a storage unit can be determined both remotely and locally. For the latter case, a display on the end of the cabinetry can summarize the status of the hardware within the row, and directly on the PCB with LED's to indicate working or failed status. In the preferred embodiment, the optical indicators can be turned off to save energy, when a human is not accessing the location; e.g., when the room lights are off, or when the aisle is closed.

In an embodiment of the invention, it is also suggested that at least some, preferably the majority and in particular preferably all of the data storage units are arranged parallel to each other and/or are stacked on their small connector end, facing one upon the other on their largest planar face, and/or wherein at least 8, preferably more than 20 data storage units are provided depending on the circumstance of the installation. It is highly preferred to have multiple rows of data storage units, and it is also preferred if each row is or some rows are provided on separate printed circuit boards and each circuit board has a separate data access circuit. This helps in maintaining general data access even where a data access to a particular circuit itself on any given board should fail.

In an embodiment of the invention, it is also suggested that the data storage units are arranged in an array of columns and rows, in particular such that extended air flow paths formed between the data storage units run vertically in operation. Note that it may be preferred to space the rows apart by several millimeters to as to avoid problems due to the transfer of shocks or vibration and so as to ease safe replacement or upgrade of the data storage units.

In a preferred embodiment of the data handling device, the data will be stored or distributed across many horizontal rows of data storage units, with one or more rows being provisioned per separate printed circuit board. This helps to avoid single points of failures, increasing overall reliability. As one CPU is required to run each board, and as the CPU is usually the most expensive component, the variance in the number of rows of disks it supports allows the designer to sway towards lower overall cost with fewer CPU, or higher performance with more CPU, with the total number of disks remaining the same. The separate boards can be interconnected to share and distribute power and/or allow ethernet connectivity between adjacent boards. The latter can provide extra system bandwidth and a certain amount of extra network robustness. Generally, the communication between arbitrary boards is via direct point-to-point or switched ethernet.

Where the data storage units are arranged in an array of columns and rows, air flow paths formed between the data storage units will typically run vertically in operation, increasing thermal circulation to both generally remove excess heat, and to equalize temperatures among the components. Note that the vertical distance between rows usually will be rather small to promote a chimney like airflow and to minimize physical size. It should be noted that the data handling device will typically comprise at least one data processor to manage the local storage array, and any excess computational power can be shared with the rest of the system.

While the data handling device might be cooled in a completely passive manner, it is also possible to implement a forced ventilation. If this is the case, a forced ventilation can be common to a plurality of data storage units, preferably to all data storage units of the data handling device in a vertical column. Similarly, a separate chimney with its own air circulation to cool the processor can be shared by a plurality of processors in one vertical column. In this manner, only a limited number of forced ventilation devices such as fans are needed that accordingly can be significantly larger, thus run at lower rotational speeds, reducing noise and energy consumption. Furthermore, it is possible to blow air through the air flow paths or to draw air through the air flow paths or both.

In an embodiment of the invention, it is also suggested that a forced ventilation common to a plurality of data storage units and preferably also common to the integrated data accessing circuit and/or the at least one data processor, is provided for forcing air through the flow paths between the data storage units. Note that it is preferred to use such forced ventilation as an auxiliary ventilation only, operating only as necessary to keep the system operating below a desired temperature threshold. Sporadically activating forced air ventilation is useful in the case of avoiding impending overheating due to the occasional unavoidable concentration of local heat generation, due to the particular combination of disks being accessed. Use of intermittent and/or variable speed cooling ventilation results in noise reduction which creates a more ergonomic environment for people working in the vicinity.

In a preferred embodiment, which is particularly reliable, two separate fans could be used, in particular alternately, and their redundancy thereby increases reliability. In such an embodied invention, it is particularly preferred if the forced air ventilation is arranged to use the same ventilator(s) for cooling both the plurality of data storage units and at least one vertical chimney containing integrated data accessing circuits and a data processor and/or data processors.

In an embodiment of the invention, it is also suggested that a data handling device comprises a housing having a hinged door cover which can be swung open such that the data storage units can be exposed to be retrieved generally perpendicular to the PCB, the door (or "cover") when closed preferably securing those data storage units in their plugged-in position. In this manner, when the door is closed the data storage units cannot move, and thus no additional parts are needed to secure the data storage units in their plugged-in position even in cases where heavy vibrations or the like may occur.

Furthermore, the invention relates to a method of operating a data handling device wherein a plurality of data storage units adapted for long term storage of data and including spare data storage units can be provided, wherein the data is distributed across the plurality of data storage units in a redundant manner, the devised method comprising testing at least some of the plurality of data storage units for malfunctions and, in automated response to a detected malfunction, initiating rebuilding on a spare disk or reserved data storage space.

It should be noted that even where reestablishing redundancy of data is done on the fly, the data stored remains accessible. It is because the stored data is accessible that makes it possible to synthesize the missing lost parity disk.

One of the typical tests of functionality relates to the response to an issued spin-up command. In case a data storage unit does not start to spin properly, failure can be assumed, and it is slated for replacement at some future scheduled maintenance date. Note however, once a unit has been denoted as failed, an automatic rebuild process can be initiated. Failed units can continue to accumulate in number, and there is no immediate need for their replacement while sufficient empty space still resides in the system.

Accordingly, protection is also sought for a method of operating a data handling device wherein a plurality of data storage units adapted for long-term storage of data including spare data storage space on data storage units is provided, the data handling device being adapted to access data distributed across the plurality of data storage units in a redundant manner, the method comprising testing at least some of the plurality of data storage units for malfunctions and, in response to a malfunction detected, rebuilding on the fly the data stored on the malfunctioning data storage unit(s) prior to or during replacement of a malfunctional data storage unit by retrieving the redundant distributed data from other data storage units.

Regarding the testing, a number of tests can be performed in various embodiments. At the time of application storing data on hard disks having rotating magnetic disks and read-write heads movable in close proximity thereto still constitute one of the cheapest ways of storing significant amounts of data. However, in such disks, a phenomenon may occur that on instructing the disks to start rotating ("spin up"), one or more heads are found to be stuck to the disk, and thus the disk will not move or spin properly. This is called "disk stiction." It is possible and useful to test whether disk stiction occurs with a given data storage unit. This test is essentially performed every time a non-spinning hard disk is asked to spin up to retrieve data. If stiction happens, it is usually after several months of inactivity, thus spinning up becomes a sort of preventive maintenance. However, the act of spinning up the disk does cause frictional wear on the disk, because the heads are not flying on a gas film at low RPMs. Therefore, one does not want to spin up a stationary disk more often than necessary. Initially a time period of one month between spin-up testing might be used, but artificial intelligence might be built into the system which over time will be more able to determine the optimal time frame. Another useful strategy is to put those disks on a list whose spin-up testing is soon due. Because only a quantity D disks of the total T disks need to be read to retrieve a file, disks within the T group and on this list would be preferentially spun up to access the required data. Wear will happen, but the disk access must happen to retrieve the data, so two tasks are completed with just one action.

It should be noted that in some circumstances such as with genomics, seismic information, physics, archival records and data backups, the data may not be accessed very often. For example, it is anticipated that genomics data may be stored for 50+ years, and only rarely need to be retrieved for personalized health card or population studies.

In such a case, it is advisable to spin up any given disk of a data handling device on a regular basis, for example once a month, to both prevent disk stiction and to ensure proper operation of the entire system and allow for early replacement of failed units.

Other functional tests can be performed. For example, the heat a data storage unit generates (or the energy it consumes, as determined by a current drawn or a voltage drop across the device) during some standard process such as reading a given amount of data can be checked to be within a well-defined range or not. If for a standard data access an increase in temperature significantly exceeding such a range or an improper energy consumption is detected, the data storage unit can be marked as malfunctional or can at least be marked for further observation or additional testing.

Also, it is noted that a number of tools exist that allow to check a "disk health." For example, the overall number of read-write accesses to the cells of an SSD is limited. After a certain amount of read/write and/or erasure accesses, the likelihood of failure increases. Therefore, it is common practice to monitor the number of accesses and to compare such use of data with guaranteed or expected numbers of failure-free access.

In a similar manner, parity errors can be recorded, and the number thereof evaluated for both SSDs and HDDs. Also, the age of a data storage unit or the length of time it has been spinning since its first use is readily available, and that information can be evaluated in testing for malfunctions. From this, it can be seen that testing for malfunctions can either relate to detecting actual current observable malfunctions or to determining predictors for the likelihood of malfunctions in a near future.

It should be noted that predicting a likelihood of upcoming malfunctions is particularly helpful where data handling devices are maintained by a professional who has to replace malfunctional data storage units for example in a leased data handling device. It may be more cost effective to replace units that have a high likelihood of a malfunction in the near future rather than to wait until the system actually has failed. This holds particularly where the data handling device is placed at a remote location that is difficult or tedious to reach for a system administrator. Also, it is possible to increase the overall storage capacity by replacing older data storage units having a lower storage capacity with data storage units having a higher data storage capacity. The least healthy disks could then be replaced first, if the system was to be upgraded incrementally.

Also, preparing the data handling device for an upcoming replacement of a data storage unit that is likely to fail soon or needs to be replaced soon can be useful if the data storage unit to be replaced soon still is operable and the data stored on this data storage unit still can be accessed and re-distributed to other disks rather than accessing the distributed redundant data from a number of disks in order to re-determine the data that was stored on a disk that already has turned completely malfunctional.

It should be noted that when doing so, look-up tables or other META data information will also be updated on the fly. In particular, it is possible to delete from any look-up table, file allocation table or other META data file information relating to the distribution of data on a particular disk, which would trigger a graceful intentional rebuild.

It should be noted that it is possible to use one and the same data handling device with either only SSDs, only HDDs or with a mixture of SSDs and HDDs. Where it is known in advance that certain data will be accessed very often, for example because the genome data from a large number of patients all need to be compared with a specific set of genomic reference data, it may be useful to store at least the reference data accessed more frequently on SSDs having a lower net energy consumption and producing significantly less noise when accessing data compared to the noise generated by a hard disk having mechanically moving parts. It is for this reason that a preferred embodiment allows for at least one SSD close to the CPU to be used as a data cache.

It should be noted that in a preferred embodiment, at least one SSD is provided; in particular an SSD can function as a local cache for reconstructing data when rebuilding an array or as an input and/or output cache. Due to a consideration to maximize speed, the data on the cache can be provided without encryption. However, care can be taken to reduce data security issues with regard to the cache SSD. For example, such caching SSD can be mounted to the PCB at the rear side of a housing not easily accessible.

It should be noted that in current generations of data storage disks, the physical thickness of SSDs and HDDs will typically be different. Hence, it might be useful to alternate between HDDs and SSDs for an improved air flow along the data storage units.

The data handling device of the present invention provides a very high data storage capacity. Such very high data storage capacity will, in a large number of embodiments, be used for data that is processed in a highly parallel manner. For example, in genomic analysis, for comparing two genomes with one another, many operations can be executed in parallel. This can be done in a manner by "streaming" data through suitable data processing devices such as FPGAs or GPUs. The advantage of streaming data through suitable data flow architectures as mentioned is that it is not necessary to retrieve and decode an instruction for every pair of operands; rather, the processor is "configured" once and then configuration is maintained over many clock cycles, even though dynamic reconfiguration is possible. Using a (re-)configurable device thus saves energy and hence, the energy consumption of the data processing when streaming those data typically stored in the large capacity data handling device of the present invention will be low. This in turn allows provision of local data processing within the data handling device. Note that even where overall process speed might be slower compared to the use of servers having ultra-high speed processors, processing can still be effective and competitive because no data needs to be transferred and having to transfer large amounts of data via long distances can significantly slow down data processing.

Then, it will also be understood that by processing data locally and outputting only certain or summary results (for example "Patient has a probability of 81.2% of developing breast cancer in view of her genomic data"), it is easier to protect privacy and hence to ensure the security of data stored. Also, depending on the specific tasks expected to be executed when handling the data, the number of data processing elements can easily be changed from data handling device to data handling device and even on the fly.

To this end, it is suggested that at least one data processor suitable for processing data streams is provided with the data handling device. In particular, the data handling device can be provided with an FPGA and/or a GPU for processing data stored on and retrieved from the data storage units. The FPGA, the GPU or the like can be provided directly on the PCB; this is possible due to the fact that the data typically stored are processed in a highly parallel manner.

Furthermore, it is noted that due to the high degree of parallelism of data processing of those data typically stored, a large number of processing elements can be provided so that high processing power can be achieved even though the frequency of each data processing element need not be particularly high. This in turn is useful as it is possible to provide a high number of processing units in the data handling device; in particular, it is possible to use the same (mechanical) interface that is also used for plugging in data storage units onto the printed circuit board.

In particular, it is possible to implement a data processing array element such as an FPGA or GPU together with some additional control circuitry, a local cache memory and even a local data storage such as a small SSD on a board that has the same outer dimensions as a 2.5 inch HDD or SSD. Data can be transferred to this unit in the same manner as data is transferred to data storage units implemented as disks, for example using the same common SATA standard. Once data to be processed has been stored in the local memory cache, for example a local SSD having a small form factor such as 1.8" but a sufficient capacity such as one terabyte, which is sufficient to store genomic data of several human patients, data processing can be effected locally.

The invention is described below in more detail with reference to the drawings.

BRIEF DESCRIPTION OF THE DRAWINGS

FIG. 1a shows an isometric front side view of a data handling device having two rows of data storage units according to an example embodiment of the present invention.

FIG. 1b shows a back side view of the data handling device of FIG. 1a.

FIG. 1c shows a partially exploded back side view of the data handling device of FIG. 1a.

DETAILED DESCRIPTION

Figure 1:
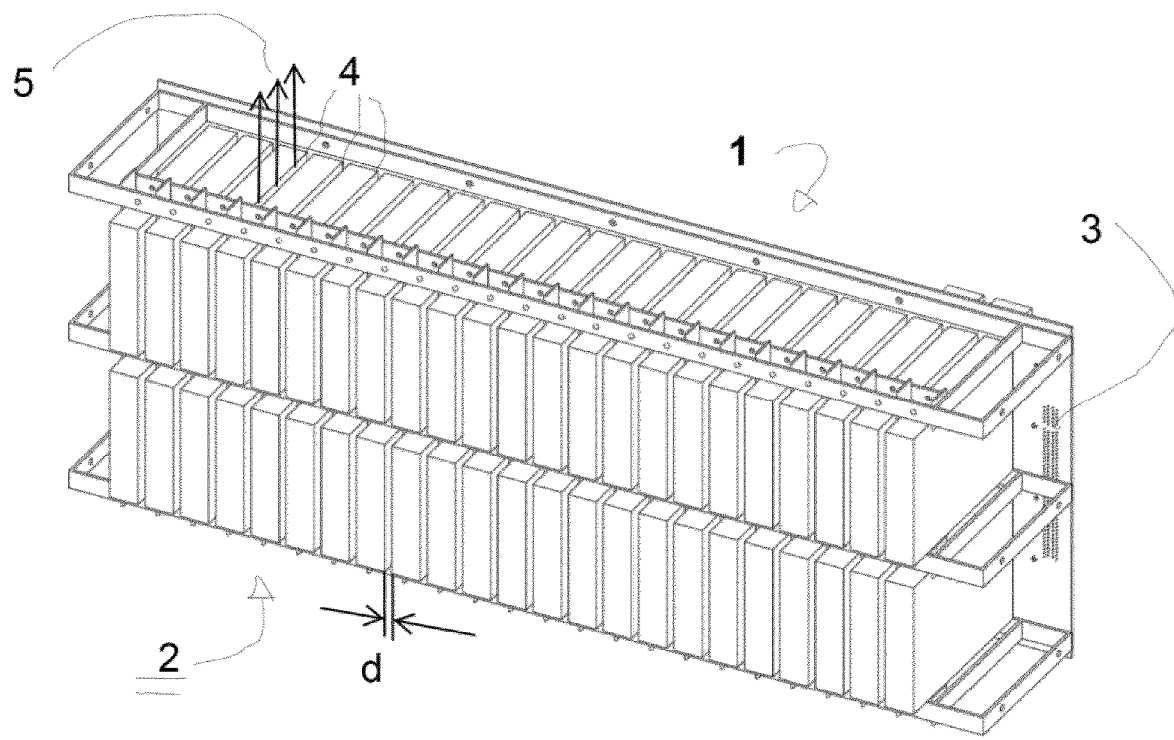
Figure 1:
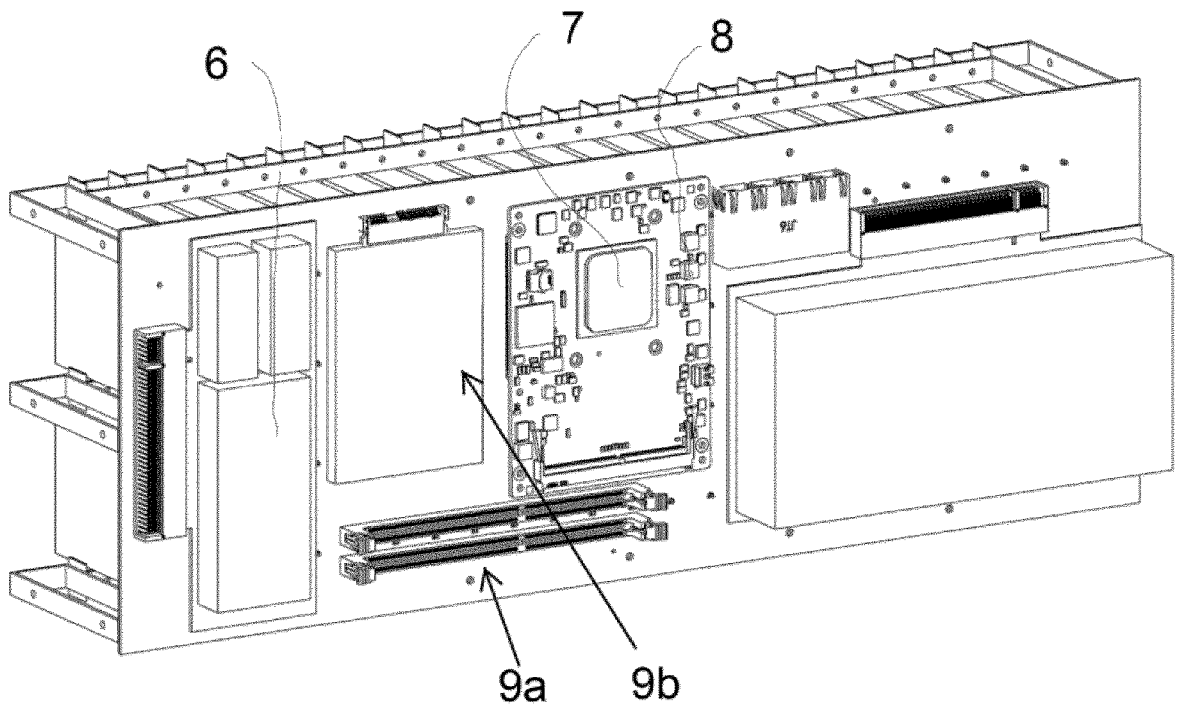
Figure 1C:
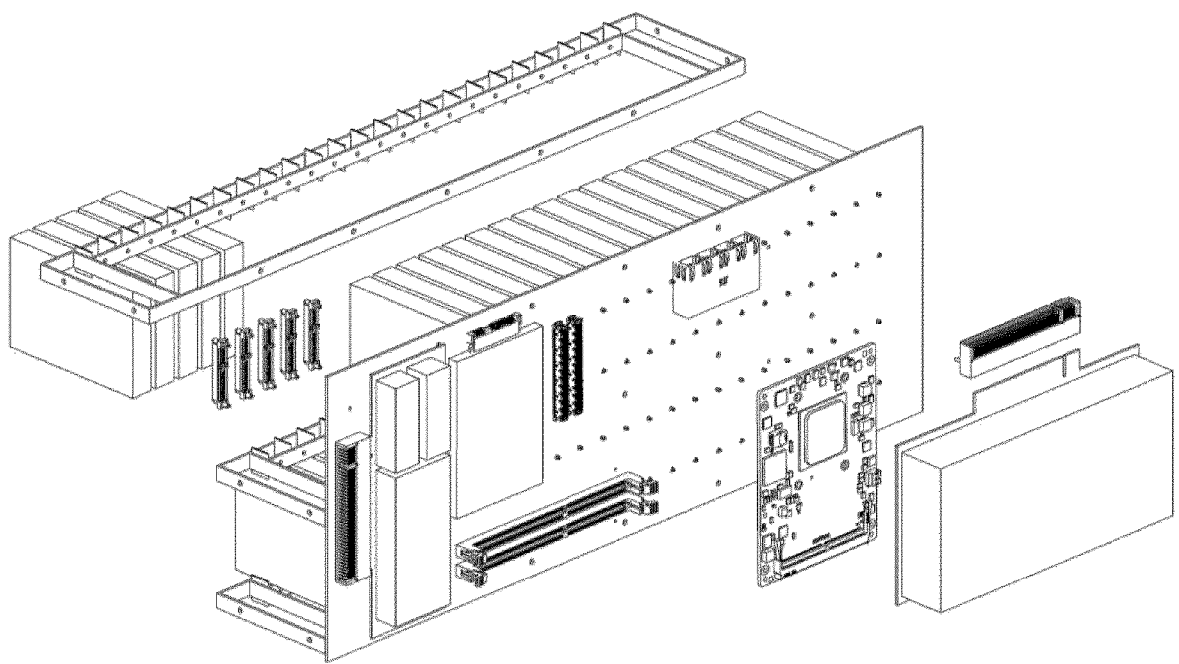

According to FIG. 1a, reference numeral 1 generally denotes a data handling device 1 comprising a plurality of data storage units 2 adapted for long term redundant storage of data, generating heat during operation, and mounted in a manner allowing cooling, and data accessing circuitry adapted to receive data to be stored, to determine a number of information chunks relating to data to be stored such that a smaller subset of the information chunks suffice for reproduction of the data, to select several of the plurality of data storage units for storing the information chunks, to write the information chunks onto the selected data storage units and to retrieve information chunks from a subset of the selected data storage units to reproduce data, wherein at least some of the plurality subset of data storage units is mounted to be cooled by a vertical air flow common to at least some of the subset of the selected data storage units and the data accessing circuitry is adapted to determine the subset of the selected data storage units from which information chunks are to be retrieved in response to temperatures of the data storage units. (The subset is "smaller" if it comprises less elements than the number of information chunks; in other words, not all information chunks are necessary to reproduce the initial data).

Physically, a common mounting printed circuit board 3 is provided for at least a plurality of the data storage units 2, (in the embodiment shown in FIG. 1a: all of the data storage units 2 for long-term storage of data), to which mounting board 3 the data storage units 2 are mounted generally perpendicular and in a manner spaced apart by a distance d such that an air flow path 4 is formed there between, allowing flow of air as indicated by arrows 5 to provide cooling. It will be understood that such an air flow path 4 is formed between every pair of adjacent disks 2 but that a line to reference numeral 4 is only drawn is only drawn from some of the air flow paths. The same holds for arrows 5 which are only shown for a single air flow path between two columns of disks.

As shown in FIG. 1b, on the backside of the double-sided printed circuit board 3, a plurality of components is provided, comprising inter alia an I/O interface 6, a local data processor GPU 7, data accessing circuits 8a, 8b and a local data cache 9 for caching data retrieved from the data storage units 2 for local processing in the GPU 7 and for storing data received prior to storing information related to data received on the data storage units. Note that similar or identical components are provided in the data handling devices shown in FIGS. 2a-3b.

The data handling device 1 shown in FIG. 1a has a separate power supply (not shown) which can be connected via standard connectors to the PCB of the data handling device 1.

It should be noted that a housing (not shown) could be provided that presses each data storage unit 2 securely into its corresponding pluggable connector during standard operation when a front cover thereof, e.g., a hinged front cover is closed. Preferably, such a housing allows fixing of the data handling device to a wall with the backside shown in FIG. 1b facing the wall.

Figure 1D:
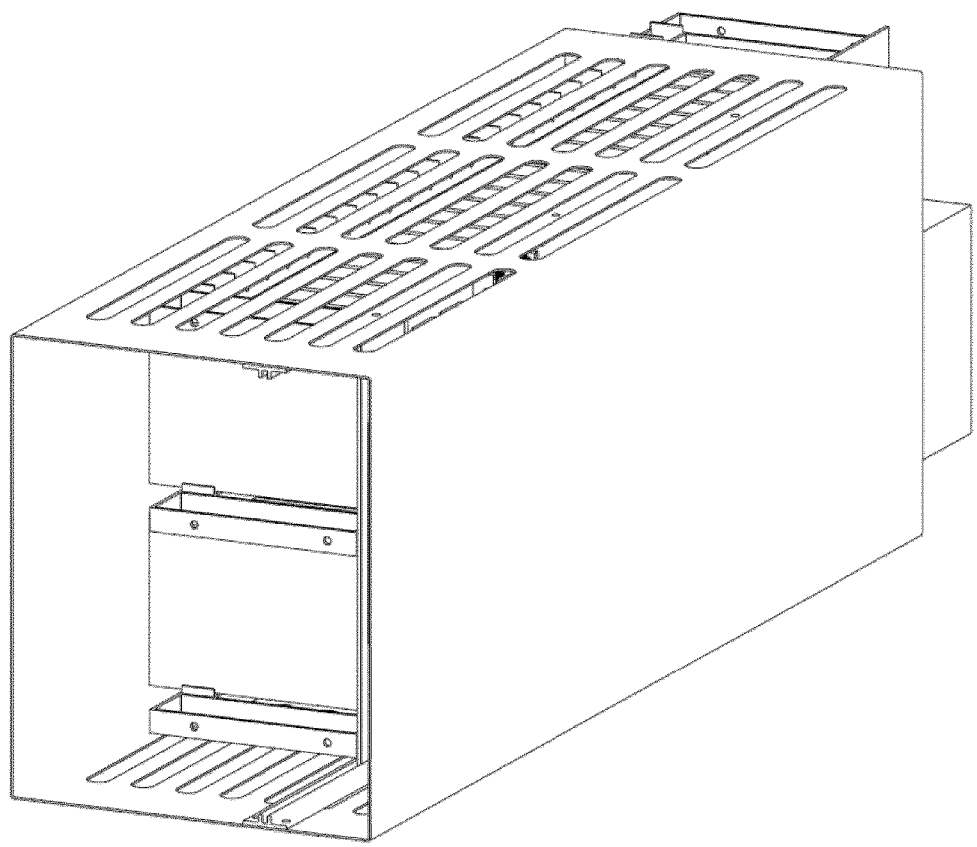
FIGS. 1d-1f show the data handling device of FIGS. 1a-1c in a housing, according to an example embodiment of the present invention.
Figure 1E:
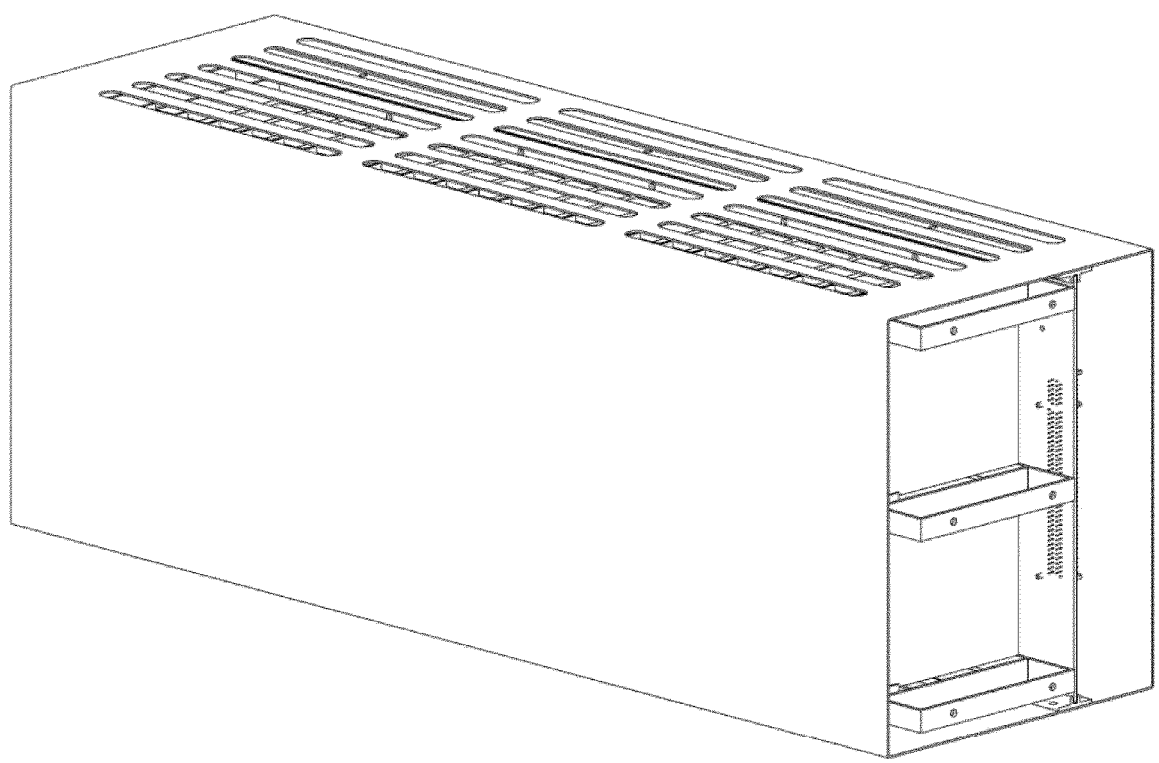
Figure 1F:
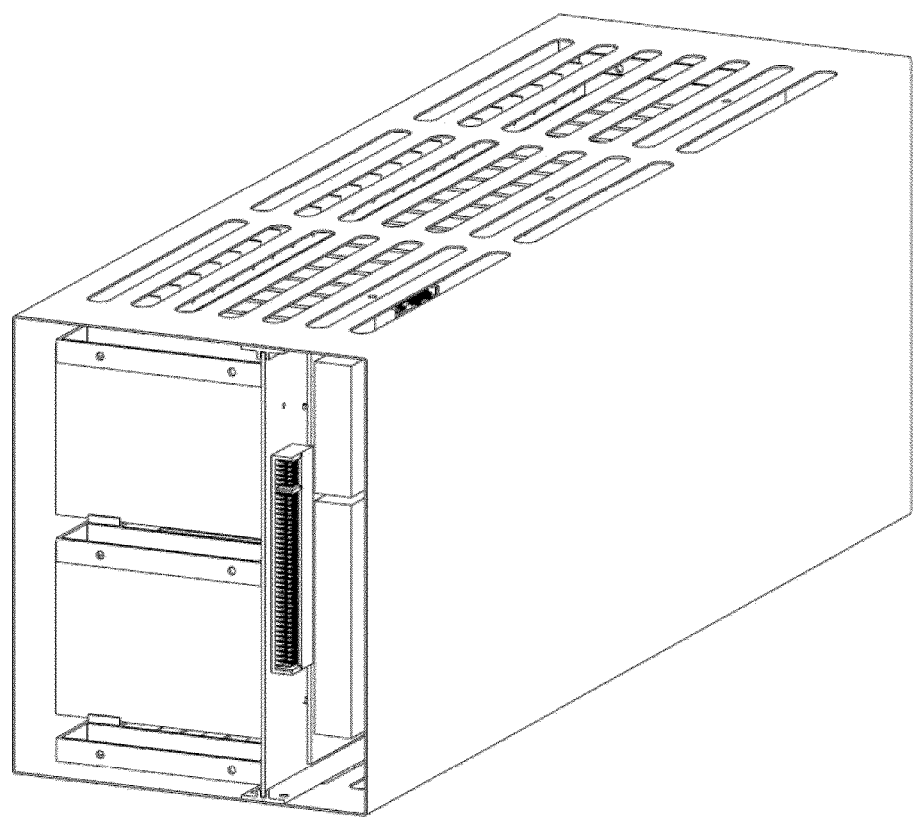
Figure 2A:
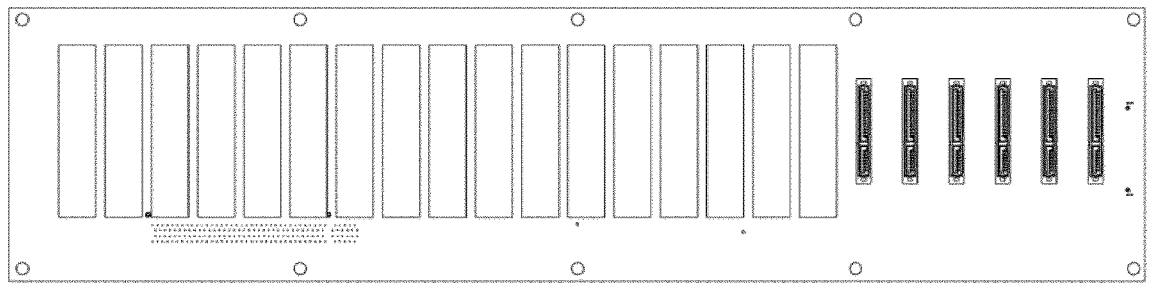
FIGS. 2a-2d show an example of a data handling device having one row of data storage units.
Figure 2B:
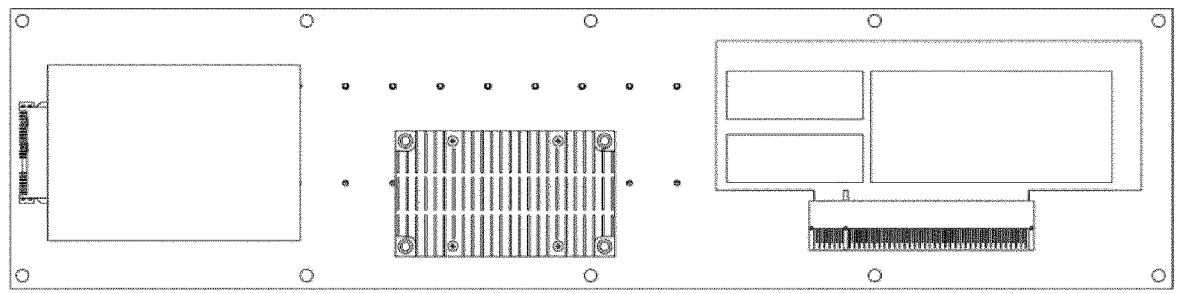
Figure 2C:
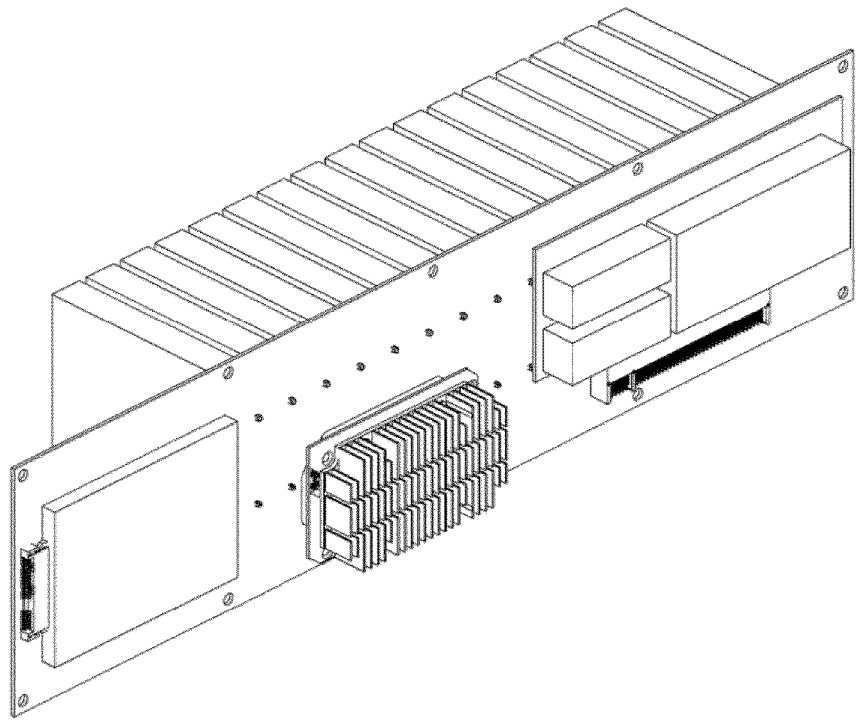
Figure 2D:
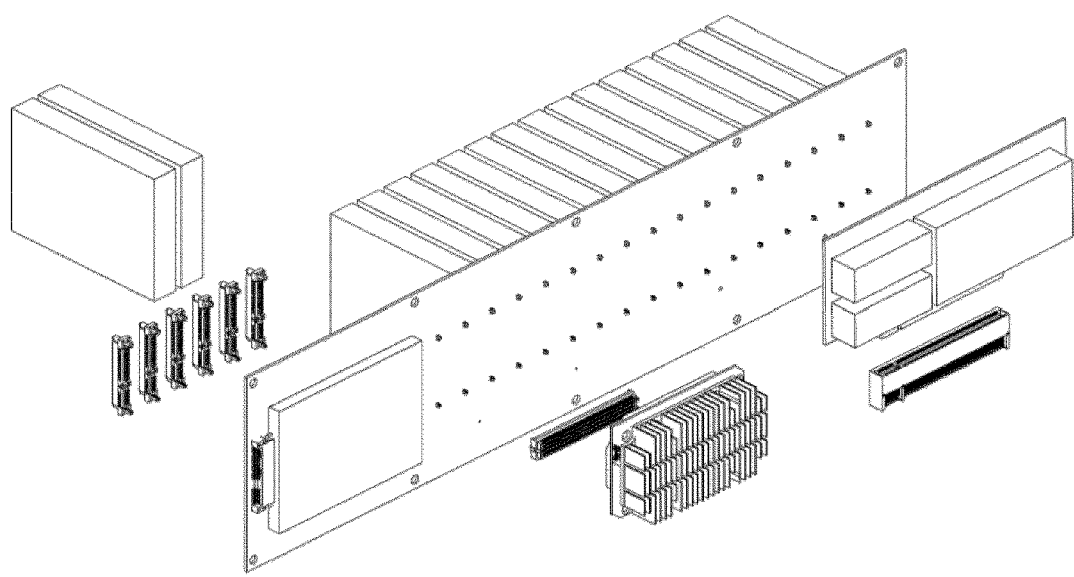
Figure 3A:
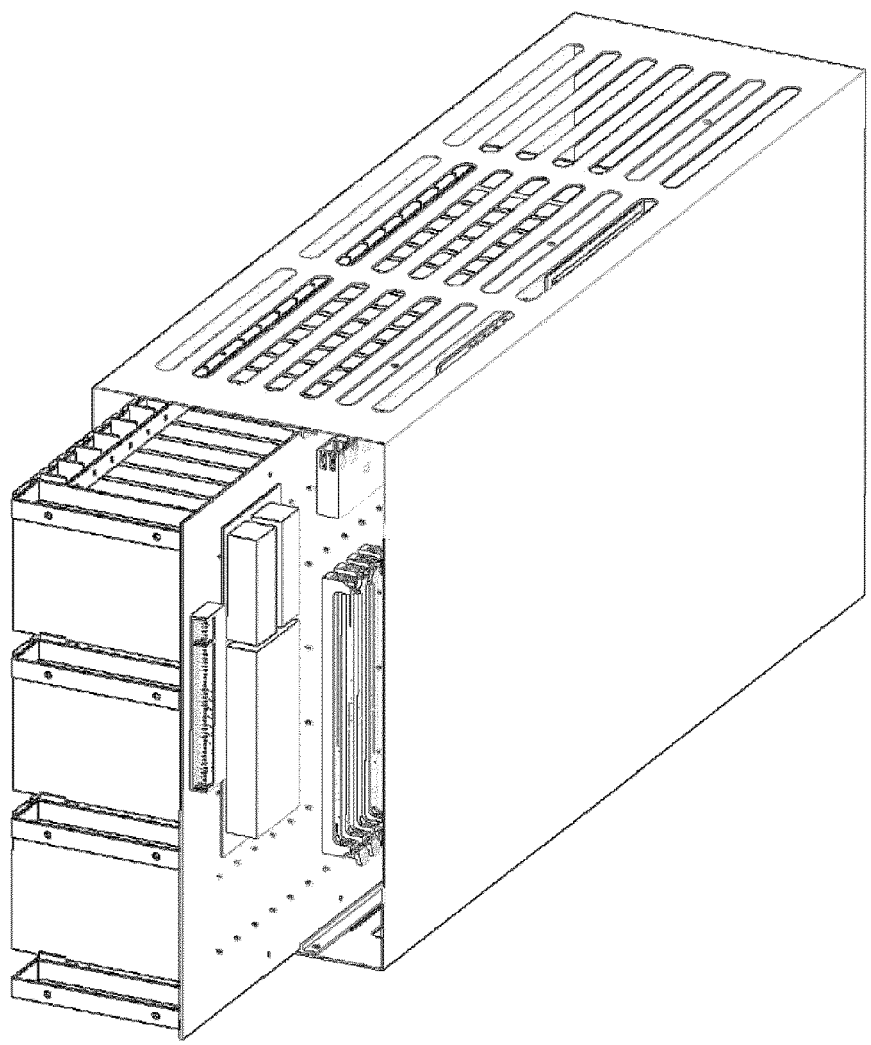
FIGS. 3a-3b show a data handling device having three or four rows of data storage units respectively.
Figure 3B:
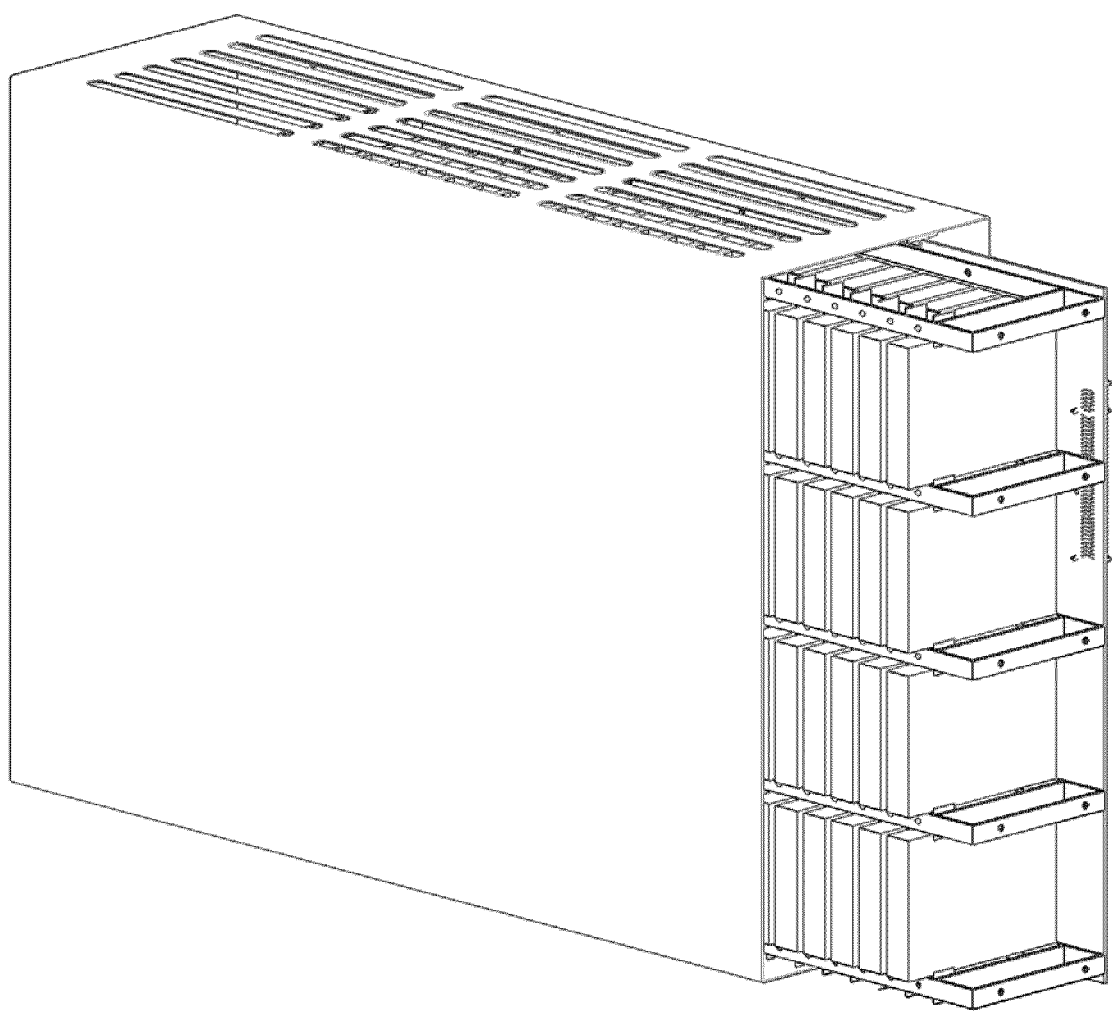

Another way of housing the data storage device is shown in FIGS. 1d-1f. Here, a mounting case is shown that allows to plug in the data storage device into a larger frame. This allows to exchange an entire case by a simple manual operation, where only robust parts need to be handled, thus often alleviating the necessity to send a particularly trained person to replace faulty equipment.

Note that where such a system is employed, typically very large data storage systems will be built. This, in turn, is helpful also to even out the heat load associated with retrieval of data. Note that typically, the number of units as shown in FIGS. 1d-1f plugged into a frame should be larger than the number of information chunks into which a data file or part thereof is split. This allows to only place one information chunk per data file or part thereof on each storage device plugged into a larger frame.

The I/O interface 6 can be any standard input/output interface such as a wireless interface circuitry or, preferably, a wired LAN connector, for example a glass fiber connector.

The data storage units 2 in the example shown in FIG. 1*a* are arranged in two rows and 23 columns. It will be understood that the exact number of data storage units 2 of the data handling device shown are merely an example and that the overall number of data storage units 2 can be varied, as can be both the number of rows, compare e.g., FIGS. 2*a*-2*d* and FIGS. 3*a*-3*b*, and the number of columns. Note that in FIGS. 2*a*, 2*c*, and 2*d* some columns are left empty on purpose to show the connectors. In some embodiments shown, a different number of data storage units per row is shown on purpose to indicate that the number of data storage units in a row is not restricted to 23. It will however be noted that it is helpful to have a sufficiently large number so as to allow for an even distribution of read load heating of disks; for example, at least 10, 15 or 20 disks can be provided to this end.

On the other hand, care should be taken that it remains possible to move the device. A conventional (3.5") hard disk easily weighs around 500 g-850 g. Providing too many hard disks on a PCB makes it difficult to lug the data storage device or the part thereof around. Accordingly, it is reasonable to restrict the number of disks such that overall weight of a unit that needs to be lifted is kept between 5 kg and 50 kg, preferably between 10-40 kg and in particular between 12 and 30 kg. Note that in some of the embodiments shown, in particular in the embodiment of FIGS. 1*a*-1*f,* additional metal or plastic frames can be attached to the PCB in a manner allowing lifting thereof or at least insertion into a case. This helps in handling the board, and as the frame might extend slightly less from the PCB then the data storage unit, might also ease removal of faulty disks or the like. A metal case such as that shown in FIGS. 1*d*-*f* may also help to improve handling.

In a preferred embodiment, an LED can be illuminated to indicate a position of a faulty disk. Where a metal or plastic frame is provided, such LED can be arranged either in the frame or such that the exact position can be determined at the frame, e.g., using a transparent light conductor.

In the embodiments shown, the data storage units 2 all are hard disks having a 2.5" form factor and a thickness of approximately 15 mm. Note that the blocks shown in FIGS. 1*a*-3*b* indicate the outer envelope and not an actual casing of each data storage unit 2. While the drawing is not exactly to scale, it can be estimated that the air flow paths 4 have a width of d of approximately 2 to 5 mm, that is each data storage unit is spaced apart from the adjacent units by approximately 2 to 5 mm.

The hard disks constituting the data storage units 2 in the example shown have SATA interfaces for which pluggable connectors are provided directly on the PCB board 3. While the holding force of a standard SATA connector is sufficient to keep a hard disk plugged-in in place without external vibrations of the entire data handling device, and even in view of internal vibrations of each data storage unit and the vibrations caused by all data storage units in common, when replacing a faulty data storage unit 2 in the middle of the array it is possible to overcome the holding force either completely without tool or with a simple tool, only such as pliers. In the embodiment shown in FIGS. 1*a*-1*f,* each hard disk or other data storage unit will have a temperature sensor (not shown) of its own and a temperature signal relating to a temperature detected with each temperature sensor is sent to the data accessing circuitry 8. Albeit this is preferred, it should be noted that in particularly large data storage center, where data has been written to disk storage units spaced far apart, it might not be necessary to provide each and every single disk with a temperature sensor, but rather have only a few sensors distributed across the system. However, obviously, it is preferred to have a temperature sensor for every hard disk or at least for every case in which a plurality of data storage units 2 are stored.

The interface 6 is adapted to provide a bandwidth and enhances speed suitable to the specific amount of data streams that need to be stored. For example, in production facility where large production machines are installed having a very large number of high frequencies sensors, I/O interface 6 might have a larger band width then in a medical laboratory where genomic data from a limited number of patients need to be stored every day. I/O interface 6 also is adapted to receive requests to provide certain information that can be derived from data stored on the data storage units 2 by data processor 7.

The data processor 7 is adapted to calculate from data received suitable redundant information to be distributed onto the disks in order to store the data coming in via interface 6 in a redundant manner on data storage units 2 according to a suitable algorithm. The data processor 7 also is adapted to retrieve information from disks 2 and to re-determine the underlying original data therefrom. The data processor 7 also is adapted to receive (sensor) information relating to a current status of each data storage unit 2, in particular, in the embodiment shown, a current spinning status, a current temperature, as well as data relating to the period of use of each data storage unit, the remaining and the used capacity of each data storage unit and health check information for each data storage unit, in particular the number of disk errors previously observed. The data processor 7 also is adapted to encode (encrypt) data to be stored and to decrypt data retrieved.

Data processor 7 furthermore is adapted to generate meta information relating to the location where specific information is stored, that is, on which data storage unit 2 in an array of data storage units 2 and, where hard disks constitute the data storage units 2 in the examples shown, on which respective blocks of a hard disks, information relating to a given data file or part of a data is stored.

In the example shown, data processor 7 is a graphics processing unit GPU provided with the capability to address a limited number of data storage units 2 via an SATA interface with the access circuitries 8*a*, 8*b* allowing to address a higher number of different data storage units 2 thus multiplying the overall number of hard disks addressable in the data handling device 1.

Data processor 7 is adapted to process data at least in response to a number of allowed requests and generate results that can be outputted via interface 6 while data processor 7 preferably is adapted to deny forbidden requests or requests not previously agreed.

Cache 9 is shown as comprising a random access memory 9*a* and a solid state disk 9*b* of suitable size so that on the one hand data is transferred into the data storage unit via interface 6 for the purpose of processing data stored on data storage units 2 as well as data retrieved from data storage units 2 for processing by data processor 7. Note that no RAM module is inserted into the standard connector for random access memory and that some of the RAM installed can also be used for storing intermediate results when data is processed onboard the PCB by the data processor 7.

It should be noted that while above it has been suggested that the data handling device is mounted in a housing that is hung to a wall, such that air can flow into the housing from below and rise due to the transfer or heat from a data handling device to the air, other possibilities exist.

For example, a spacer could be provided below a housing so as to place the data handling device onto a table or the floor. It is to be understood that such a spacer also allows the flow of air into the lower side of a housing, enabling cooling of the data handling device.

It will also be understood that a spacer could be arranged such that the data handling device can easily be moved around across an underground such as a table or the floor. For example, wheels could be provided below the data handling device. This is particularly advantageous where a large number of data handling devices is to be provided in close proximity to each other. As the number of connectors that needs to be provided for each data handling device is small, comprising for example only suitable power connections to either a power supply or a power outlet and one single high band width data connector, any connectors needed can easily be made sufficiently long to not prevent movement of the data handling device.

Thus, the data handling device can easily be made mobile and storage density increased further, in particularly in view of the fact that the weight of the data handling device will be significantly lower than for a racked solution so that any constraints due to the static of architectural buildings is significantly relaxed vis-à-vis racked solutions known in the prior art.

While algorithms are known to distribute information onto the disks, it is to be emphasized that at least in a preferred embodiment, it is possible to rebuild an array on the fly and hence maintain redundancy even though some disks already have failed and need to be replaced. This will be exemplified hereinafter with respect to the tables assuming that from any data block A, B, C, D, E, F, G, H, K, L, three information parts a1, a2, a3; b1, b2, b3; c1, c2, c3; d1, d2, d3; e1, e2, e3; f1, f2, f3; g1, g2, g3; h1, h2, h3; k1, k2, k3; l1, l2, l3 respectively are derived and stored on the disks. Note that in a preferred embodiment, an incoming data file is first split into several data parts and then, from these data parts, the respective redundant information to be stored on the disks is determined. For example, a first data file can comprise data blocks A, B, and C; a second data file can comprise data blocks D and E. A third data block can comprise data blocks F, G, H and L. Note that hence, in the example, the information from each data file is distributed to more than three disks.

Note that in a practical embodiment, more than 3 information parts will be generated, for example 15 information parts, and that in a particularly secure embodiment, simultaneous failure of up to 5 data storage units will be allowed whereas in the example, only one data storage unit is allowed to fail.

In Table 1, it is shown how the information parts are stored on 6 disks D1-D6. In the table, a number of blocks for each disk remain free, indicating that storage space on the disk is left unused. It can be seen that overall, data is distributed in a somewhat random manner on the 6 disks. Assume now that disk 3 fails as indicated in Table 2. In order to maintain redundancy, the data that was previously stored on disk D3 needs to be stored on the remaining non-failed disks, this can be done in a manner preventing that any disk still operative receives more than one information part of each data packet a –1. The resulting pattern as shown in Table 3 as follows:

What is done to rebuild the data from D3 once D3 has failed is retrieve the META information file from any working disk to determine where the data needed to rebuild redundancy is stored. By this, it can be determined that.

a1, d2 shall be read from D1;
b1, e2 shall be read from D2;
b3, c2 shall be read from D4;
a3, d3 shall be read from D5;
c3, e3 shall be read from D6.

Then, a2, b2, c1, d1, e1 previously stored on D3 can be reconstructed. Then, a decision is needed where to store reconstructed a2. a2 can be written to any disk other than D1 and D5. Similarly, b2 can be written to any disk other than D2 or D4. c1 can be written to any disk other than D4 and D6. d1 can be written to any disk other than D1 or D5. e1 can be written to any disk other than D2 and D6. In the sample given in Table 3, c1 is written to D1, a2 is written to D2, e1 is written to D4, b2 is written to D5 and d1 is written to D6. The meta file can be updated to META* and the META file can be replaced or erased. This can be done prior to replacing D3 and hence the system remains operative and redundancy is reestablished as soon as possible.

Note that while some implementations of a data handling device disclosed herein clearly profit from using air flow paths between the data storage units, it is possible to implement an improved data device even though no air flow paths are provided based on the ideas suggested herein. For example, when only data security against loss and/or theft is considered a problem, it may suffice to implement a system with erasure coding, in particular based on Mojette transforms, deleting all primary data and storing only the redundant "parity" information corresponding thereto on a large number of disks x+y, adding additional disks z to the set with x typically $\in[8\ldots 20]$, $[y\in[2\ldots 10]$, $z\in[2\ldots 10]$, typically, x+y>15, y>5. Then, access and testing schemes as described above can easily be used even without air flow paths, although, of course, this would be possible as well.

It will be understood that for storing extremely large amounts of data, a very large number of data storage units must be used. These typically will be controlled by a plurality of different data access circuits such as local GPUs, CPUs, FPGAs asf. To retrieve data, communication channels can then be provided between such units, using known protocols, e.g., ethernet protocols. It is preferred to use ethernet routers and/or switches and/or interfaces for other protocols onboard a plurality of PCBs, preferably on each PCB. A connection can be provided e.g., in a tree like manner. In such a case, a tree distance can also be taken into account when retrieving data to take into account latency, and also, energy of data transmission.

Also, using a tree-like topology is preferred, because then, the data storage units can be more easily grouped in branches, twigs, leaves asf., reducing the number of connections (edges) necessary at each node. This in turn is advantageous for another reason. Data storage units according to the invention can be operated in a manner where the heat density remains low, so that it is possible to increase the packing density without causing overheating. Increasing the packing density is possible inter alia by placing a plurality of data storage units into a number of mobile racks. In more detail, a plurality of PCBs, in particular housed in a housing with only a backside hot-pluggable data transmission/power connector, can be arranged in a shelve-like rack. As only a very limited number of interconnections between such racks. respectively to a power outlet, is necessary, it is feasible to move the racks without risk of disconnecting the racks either from one another or from power. This in turn allows to use mobile racks that can be moved in closed vicinity to each other as long as no physical access is required. Mobile shelves are well known for storing e.g., books in an archive. In a similar manner, data storage units can be placed in such mobile racks. Care should however be taken that moving the racks should not cause jerking in particular where disks are spinning. However, in such a case, the risk can be minimized by properly distributing the access to disks in non-moving shelves or by temporarily "parking" the disks at least during acceleration of the shelves.

TABLE 1

Inital state after some use

| D1 | D2 | D3 | D4 | D5 | D6 |
|---|---|---|---|---|---|
| a1 | b1 | a2 | b3 | a3 | c3 |
| d2 | e2 | b2 | c2 | d3 | e3 |
| f1 | f2 | c1 | f3 | g2 | g3 |
| h1 | g1 | d1 | h2 | k2 | h3 |
| k1 | l1 | e1 | l2 | l3 | k3 |
| META | META | META | META | META | META |

TABLE 2

D3 fails

| D1 | D2 | D3 | D4 | D5 | D6 |
|---|---|---|---|---|---|
| a1 | b1 | x | b3 | a3 | c3 |
| d2 | e2 | x | c2 | d3 | e3 |
| f1 | f2 | x | f3 | g2 | g3 |
| h1 | g1 | x | h2 | k2 | h3 |
| k1 | l1 | x | l2 | l3 | k3 |
| META | META | X | META | META | META |

TABLE 3

Rebuild system on the fly

| D1 | D2 | D3 | D4 | D5 | D6 |
|---|---|---|---|---|---|
| a1 | b1 | x | b3 | a3 | c3 |
| d2 | e2 | x | c2 | d3 | e3 |
| f1 | f2 | x | f3 | g2 | g3 |
| h1 | g1 | x | h2 | k2 | h3 |
| k1 | l1 | x | l2 | l3 | k3 |
| c1 | a2 |   | e1 | b2 | d1 |
| META* | META* |   | META* | META* | META* |

While in this application, the connectors in one embodiment have been disclosed to be SATA connectors, other interfaces and standards could be used as well, e.g., eSata, IDE, SAS, SCSI, NVMe asf.

The invention claimed is:

1. A data handling device comprising:
a plurality of data storage units that:
are adapted for long term redundant storage of data; and
generate heat when the data storage units are in operation; and
data accessing circuitry configured to:
receive data to be stored;
determine a number of information chunks relating to the data to be stored such that the data to be stored is reproducible based on a subset of, without requiring all of, the information chunks;
select several of the plurality of data storage units for storing the information chunks;
write the information chunks onto the selected data storage units;
based on respective temperatures of the selected data storage units onto which the information chunks were written, determine a subset of the selected data storage units from which to retrieve respective ones of the information chunks for reproduction of the data; and
reproduce the data by retrieving respective ones of the information chunks from the determined subset of the selected data storage units;
wherein:
at least some of the subset of the selected data storage units are mounted in a manner by which the at least some of the subset of the selected data storage units can be cooled by a common vertical air flow; and
the data accessing circuitry is configured to perform the determination of the subset of the selected data storage units from which to retrieve the respective ones of the information chunks at least one of (a) based on a thermal load that is determined will be induced by the retrieving, and (b) in a manner by which to minimize a gradient at which the data storage units are cooled.

2. A data handling device according to claim 1, wherein the data accessing circuitry is configured to select a subset of the plurality of data storage units into which data is to be distributed in a writing operation based on respective temperatures of the plurality of data storage units.

3. A data handling device according to claim 1, wherein the data accessing circuitry is configured to access data distributed across the plurality of data storage units in a redundant manner based on a current state of at least some of the data storage units, the current state being a current spinning state of a hard disk and/or a current thermal load induced by writing and/or reading.

4. A data handling device according to claim 1, comprising a printed circuit board (PCB) on which connectors for a plurality or all of the data storage units are attached, the data storage units being pluggedly connected to the connectors.

5. A data handling device according to claim 4, comprising a housing having a cover that can be transitioned between an open state and closed state, wherein at least some of the data storage units are secured in their plugged-in position by the cover when the cover is in the closed state and can be retrieved approximately perpendicularly to the PCB when cover is in the open state.

6. A data handling device according to claim 4, wherein:
the PCB is a double-sided PCB including a first side and a second side;
at least one of an integrated data accessing circuit and a part of the data storage units is pluggably connected on the first side of the PCB; and
at least some of the data storage units, other than the part of the data storage units, are pluggably connected to the second side of the PCB.

7. A data handling device according to claim 1, wherein the mount comprises a printed circuit board (PCB) on which connectors for a plurality or all of the data storage units are attached, the data storage units being hot-pluggedly connected to the connectors.

8. A data handling device according to claim 1, wherein the data handling device is configured to store the data in an encrypted manner by encrypting at least one of:
data written to the data storage units in a distributed manner; and/or
information relating to the distribution of the data across the plurality of data storage units.

9. A data handling device according to claim 1, wherein at least some of the plurality of data storage units are hard disk drives (HDDs) and/or solid state drives (SSDs).

10. A data handling device according to claim 1, wherein at least some of the plurality of data storage units are hard disk drives (HDDs) and/or solid state drives (SSDs) having a 2.5" or 3.5" form factor.

11. A data handling device according to claim 1, wherein:
at least some of the data storage units are arranged parallel to each other and/or are stacked; and/or
at least 8 of the data storage units are provided in each of several rows.

12. A data handling device according to claim 1, wherein the data storage units are arranged in an array of columns and rows such that air flow paths formed between the data storage units run vertically when the data storage units are in operation.

13. A data handling device according to claim 1, wherein the data accessing circuitry is part of at least one data processor for processing data to be stored on the data storage units and/or to be retrieved from the data storage units, the data processor including at least one of one or more central processing units (CPUs), one or more digital signal processors (DSPs), one or more graphics processing units (GPUs), and/or one or more field programmable gate arrays (FPGAs).

14. A data handling device according to claim 1, further comprising a forced ventilation common to the plurality of data storage units and the data accessing circuitry, the forced ventilation being configured to force air through flow paths between the data storage units.

15. A data handling device according to claim 14, wherein the forced air ventilation includes a same one or more ventilators for cooling both the plurality of data storage units and the data accessing circuitry.

16. A data handling device according to claim 1, wherein the data accessing circuitry is configured to perform the determination of the subset of the selected data storage units from which to retrieve the respective ones of the information chunks based on the thermal load that is determined will be induced by the retrieving.

17. A data handling device according to claim 16, wherein the determination of the subset is made in a manner by which to level a distribution of temperatures over the data storage units.

18. A data handling device according to claim 16, wherein the determination of the subset is made in a manner by which to minimize a temperature gradient.

19. A data handling device according to claim 16, wherein the determination of the subset is made in a manner by which to minimize a gradient of a temperature change over time.

20. A data handling device according to claim 1, wherein the data accessing circuitry is configured to perform the determination of the subset of the selected data storage units from which to retrieve the respective ones of the information chunks in the manner by which to minimize the gradient at which the data storage units are cooled.

21. A data handling device comprising:
at least 10 hard disks that:
are adapted for long term redundant storage of data; and
generate heat when the hard disks are in operation; and
data accessing circuitry configured to:
receive data to be stored;
determine a number of information chunks relating to the data to be stored such that the data to be stored is reproducible based on a subset of, without requiring all of, the information chunks;
select several of the at least 10 hard disks for storing the information chunks such that the data can be reproduced even when more than one of the selected hard disks fail;
write the information chunks onto the selected hard disks;
based on respective temperatures of the selected hard disks onto which the information chunks were written, determine a subset of the selected hard disks from which respective ones of the information chunks, on the basis of which the data is reproducible, can be retrieved without overheating, in a manner that minimizes use of currently non-spinning disks, and such that a heat capacity of the hard disks is used in a manner that allows the hard disks to heat up over an extended period of use and to then slowly cool; and
reproduce the data by retrieving respective ones of the information chunks from the determined subset of the selected hard disks;
wherein:
at least some of the subset of the selected hard disks can be subject to the slow cooling by a common vertical air flow due to the at least some of the subset of the selected hard disks being mounted in rows in a manner by which those of the at least some of the subset of the selected hard disks that are arranged in one of the rows:
are spaced apart from one another by a distance between 1 mm and 10 mm; and
face one another with their respective largest planar faces such that air flow paths between adjacent ones of those of the at least some of the subset of the selected hard disks that are arranged in the one of the rows conform to air flow paths in an adjacent row above or below the one of the rows; and
the data accessing circuitry is configured to at least one of:
(a) perform the determination of the subset in a manner by which to minimize a gradient at which the hard disks are cooled; and
(b) perform at least one access in a manner that is based on a thermal load that will be induced by the at least one access, the at least one access being a queued writing and/or a scheduled reading.

22. A data handling device according to claim 21, wherein the data accessing circuitry is configured to determine into which of the hard disks to distribute data being written based on current temperatures of the hard disks.

23. A data handling device according to claim 21, wherein the data accessing circuitry is configured to perform the at least one access in the manner that is based on the thermal load that will be induced by the at least one access, the at least one access being the queued writing and/or the scheduled reading.

24. A data handling device according to claim 23, wherein the at least one access is made in a manner by which to level a distribution of temperatures over the data storage units.

25. A data handling device according to claim 23, wherein the at least one access is made in a manner by which to minimize a temperature gradient.

26. A data handling device according to claim 23, wherein the at least one access is made in a manner by which to minimize a gradient of a temperature change over time.

27. A data handling device according to claim 21, wherein the data accessing circuitry is configured to perform the determination of the subset of the selected hard disks from which the respective ones of the information chunks are retrieved based additionally on a bandwidth available for accessing a given hard disk and/or on a current usage of the given hard disk by other retrieval requests.

28. A data handling device according to claim 21, wherein the data accessing circuitry is configured to perform the determination of the subset in the manner by which to minimize the gradient at which the hard disks are cooled.

29. A data handling device comprising:
a plurality of data storage units that:
  are adapted for long term redundant storage of data; and
  generate heat when the data storage units are in operation; and
data accessing circuitry configured to:
  receive data to be stored;
  determine a number of information chunks relating to the data to be stored such that the data to be stored is reproducible based on a subset of, without requiring all of, the information chunks;
  select several of the data storage units for storing the information chunks such that the data can be reproduced even when more than one of the selected data storage units fail;
  write the information chunks onto the selected data storage units;
  based on (a) respective temperatures of the selected data storage units onto which the information chunks were written and (b) which of the data storage units are currently in an idle state, determine a subset of the selected data storage units from which respective ones of the information chunks, on the basis of which the data is reproducible, can be retrieved without overheating, such that a heat capacity of the data storage units is used in a manner that allows the data storage units to heat up over an extended period of use and to then slowly cool; and
  reproduce the data by retrieving respective ones of the information chunks from the determined subset of the selected data storage units;
wherein:
  at least some of the subset of the selected data storage units can be subject to the slow cooling by a common vertical air flow due to the at least some of the subset of the selected data storage units being mounted in rows in a manner by which those of the at least some of the subset of the selected data storage units that are arranged in one of the rows:
    are spaced apart from one another by a distance between 1 mm and 10 mm; and
    face one another with their respective largest planar faces such that air flow paths between adjacent ones of those of the at least some of the subset of the selected data storage units that are arranged in the one of the rows conform to air flow paths in an adjacent row above or below the one of the rows; and
  the data accessing circuitry is configured to perform the determination of the subset at least one of (a) such that the determination of the subset is further based on a thermal load that is determined will be induced by at least one of queued writing and queued reading, and (b) in a manner by which to minimize a gradient at which the data storage units are cooled.

30. A data handling device according to claim 29, wherein the data accessing circuitry is configured such that the determination of the subset is further based on the thermal load that is determined will be induced by the at least one of the queued writing and the queued reading.

31. A data handling device according to claim 30, wherein the determination of the subset is made in a manner by which to level a distribution of temperatures over the data storage units.

32. A data handling device according to claim 30, wherein the determination of the subset is made in a manner by which to minimize a temperature gradient.

33. A data handling device according to claim 30, wherein the determination of the subset is made in a manner by which to minimize a gradient of a temperature change over time.

34. A data handling device according to claim 29, wherein the data accessing circuitry is configured such that the determination of the subset is further based on at least one of respective bandwidths available for accessing respective ones of the data storage units and respective current usages of the respective ones of the data storage units by other retrieval requests.

35. A data handling device according to claim 29, wherein one or more of the data storage units is a hard disk, and the data accessing circuitry is configured to discriminate between a spinning state and an idle state of the one or more hard disks and is configured such that the determination of the subset is further based on the discrimination between the spinning state and the idle state.

36. A data handling device according to claim 29, wherein the data accessing circuitry is configured to perform the determination of the subset in a manner by which to minimize the gradient at which the data storage units are cooled.

* * * * *